(12) United States Patent
Ananthakrishnan et al.

(10) Patent No.: US 11,442,529 B2
(45) Date of Patent: Sep. 13, 2022

(54) SYSTEM, APPARATUS AND METHOD FOR DYNAMICALLY CONTROLLING CURRENT CONSUMPTION OF PROCESSING CIRCUITS OF A PROCESSOR

(71) Applicant: Intel Corporation, Santa Clara, CA (US)

(72) Inventors: Avinash N. Ananthakrishnan, Portland, OR (US); Ameya Ambardekar, Hillsboro, OR (US); Ankush Varma, Portland, OR (US); Nimrod Angel, Haifa (IL); Nir Rosenzweig, Givat Ella (IL); Arik Gihon, Rishon le Zion (IL); Alexander Gendler, Kiriat Motzkin (IL); Rachid E. Rayess, Hudson, MA (US); Tamir Salus, Zikhron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 16/412,606

(22) Filed: May 15, 2019

(65) Prior Publication Data

US 2020/0363860 A1    Nov. 19, 2020

(51) Int. Cl.
*G06F 1/00* (2006.01)
*G06F 1/3234* (2019.01)
(Continued)

(52) U.S. Cl.
CPC .......... *G06F 1/3275* (2013.01); *G06F 1/3296* (2013.01); *G06F 9/3891* (2013.01); *G06F 11/348* (2013.01); *G06F 11/349* (2013.01)

(58) Field of Classification Search
CPC .... G06F 1/3275; G06F 1/3296; G06F 9/3891; G06F 11/349; G06F 11/348; G06F 2201/81; G06F 11/3024; G06F 11/3058
See application file for complete search history.

(56) References Cited

U.S. PATENT DOCUMENTS 5,163,153 A    11/1992   Cole et al.
5,522,087 A    5/1996    Hsiang
(Continued)

FOREIGN PATENT DOCUMENTS

EP    1 282 030 A1    5/2003
KR    1020150079410   7/2015
KR    1020190008531   1/2019

OTHER PUBLICATIONS

International Searching Authority, "Notification of Transmittal of the International Search Report and the Written Opinion of the International Searching Authority," dated Jul. 9, 2020, in International application No. PCT/US2020/023580.
(Continued)

*Primary Examiner* — Xuxing Chen
(74) *Attorney, Agent, or Firm* — Trop, Pruner & Hu, P.C.

(57) ABSTRACT

In one embodiment, an apparatus comprises: a plurality of intellectual property (IP) circuits, each of the plurality of IP circuits including a configuration register to store a dynamic current budget; and a power controller coupled to the plurality of IP circuits, the power controller including a dynamic current sharing control circuit to receive current throttling hint information regarding a workload to be executed on at least some of the plurality of IP circuits and generate the dynamic current budget for each of the plurality of IP circuits based at least in part thereon. Other embodiments are described and claimed.

16 Claims, 24 Drawing Sheets

(51) Int. Cl.
    *G06F 1/3296*  (2019.01)
    *G06F 9/38*    (2018.01)
    *G06F 11/34*   (2006.01)

(56) References Cited

U.S. PATENT DOCUMENTS

| | | | |
|---|---|---|---|
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,730,340 | B2 | 6/2010 | Hu et al. |
| 9,274,574 | B2 | 3/2016 | Conroy et al. |
| 9,703,351 | B2 * | 7/2017 | Carlson ............... G06F 1/329 |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2006/0288241 | A1 * | 12/2006 | Felter ............... G06F 1/3203 713/300 |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0028240 | A1 | 1/2008 | Arai et al. |
| 2008/0250260 | A1 | 10/2008 | Tomita |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0154090 | A1 | 6/2011 | Dixon et al. |
| 2012/0079290 | A1 | 3/2012 | Kumar |
| 2012/0246506 | A1 | 9/2012 | Knight |
| 2013/0061064 | A1 | 3/2013 | Ananthakrishnan et al. |
| 2013/0080803 | A1 | 3/2013 | Ananthakrishnan et al. |
| 2013/0080804 | A1 | 3/2013 | Ananthakrishnan et al. |
| 2013/0111120 | A1 | 5/2013 | Ananthakrishnan et al. |
| 2013/0111121 | A1 | 5/2013 | Ananthakrishnan et al. |
| 2013/0111226 | A1 | 5/2013 | Ananthakrishnan et al. |
| 2013/0111236 | A1 | 5/2013 | Ananthakrishnan et al. |
| 2013/0346774 | A1 | 12/2013 | Bhandaru et al. |
| 2014/0068290 | A1 | 3/2014 | Bhandaru et al. |
| 2014/0195829 | A1 | 7/2014 | Bhandaru et al. |
| 2014/0208141 | A1 | 7/2014 | Bhandaru et al. |
| 2015/0309551 | A1 * | 10/2015 | Yeager ............... G06F 11/3013 713/320 |
| 2016/0070327 | A1 | 3/2016 | Nemani et al. |
| 2016/0239074 | A1 * | 8/2016 | Lee ............... G06F 9/50 |
| 2018/0356868 | A1 * | 12/2018 | Keceli ............... G06F 1/26 |
| 2019/0041969 | A1 | 2/2019 | Nge et al. |
| 2019/0041971 | A1 * | 2/2019 | Ananthakrishnan ............... G06F 9/30101 |
| 2019/0042280 | A1 | 2/2019 | Shanbhogue et al. |
| 2019/0052076 | A1 * | 2/2019 | Asam ............... H02H 3/08 |
| 2019/0377395 | A1 * | 12/2019 | Kaburlasos ............... G06F 1/28 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 39 pages.
Intel Technology Journal, "Power and Thermal Management in the Intel Core Duo Processor," May 15, 2006, pp. 109-122.
International Application No. PCT/US18/30517, filed May 1, 2018, entitled "Power Control Arbitration," by Intel Corporation.
U.S. Appl. No. 16/230,440, filed Dec. 21, 2018, entitled "Apparatus and Method for Proactive Power Management," by Chee Lim Nge.

* cited by examiner

SYSTEM, APPARATUS AND METHOD FOR DYNAMICALLY CONTROLLING CURRENT CONSUMPTION OF PROCESSING CIRCUITS OF A PROCESSOR

TECHNICAL FIELD

Embodiments relate to power management of a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
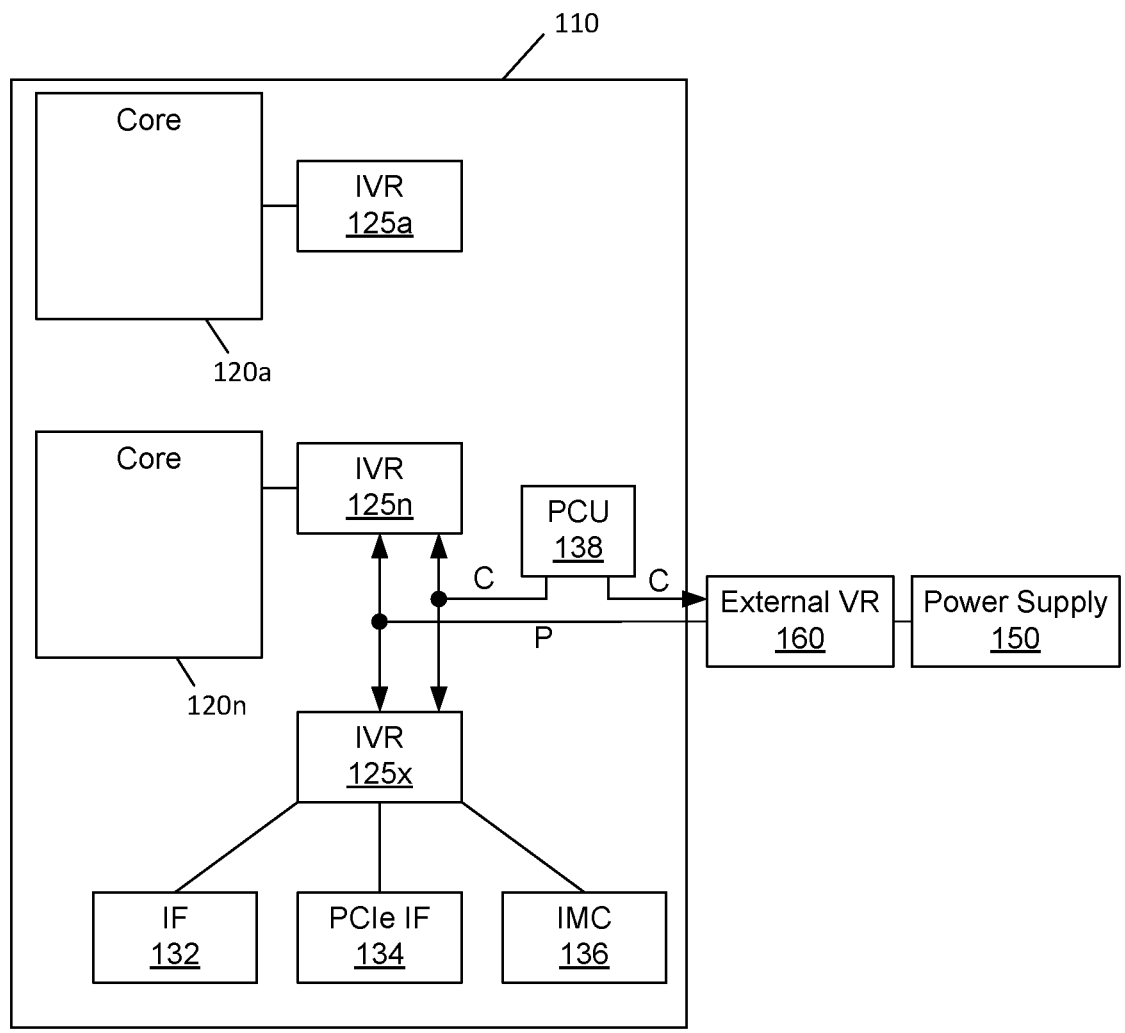
FIG. 1 is a block diagram of a portion of a system in accordance with an embodiment of the present invention.

In various embodiments, a processor is configured to dynamically determine independently controllable maximum current consumption capabilities for each of multiple processing circuits of the processor. For example, the processor may be a multicore processor or other system on chip (SoC) including a variety of different processing circuits including general-purpose processing cores, graphics processors and so forth. With embodiments herein, a power controller may dynamically determine independent current consumption limits for each of the processing circuits based at least in part on information received from a software entity, such as an operating system or other scheduler, or an application itself. Such information may identify relative priority or importance of the different processing circuits for a given workload, such that dynamic, independent and controllable current consumption values can be provided on a per core (or other processing circuit) basis.

In this way, when a power excursion is encountered during operation, throttling of individual processing circuits may be performed independently so as to have as limited effect on a workload in execution as possible. In contrast, conventional throttling of processing circuits occurs with predefined static amounts of throttling when a power excursion occurs. Such static arrangement is set to satisfy an entire spectrum of workload behavior and is not optimal for any given case. Instead with embodiments, by dynamically configuring allowable current consumption by individual processing circuits, an optimal throttling behavior may be realized for any given workload in execution.

As high level examples, consider a first workload case that is core-centric and has a minor amount of graphics processing. Consider a second workload case where the cores are not heavily used, and the graphics processor is highly used. With appropriate hint information provided by a software entity, dynamic and controllable determination of maximum current consumption levels by these different processing circuits can be provided and enforced. As such, for the first workload, where the cores may be performing work that impacts workload responsiveness, such cores may not be throttled to the extent that the graphics processors are throttled. Instead for the second workload case where the graphics processors may be performing user-visible work, higher levels of throttling may occur as to cores than for the graphics processors. As such, different processing circuits may be throttled differently based on different workloads that may be in execution.

With embodiments, a software interface enables a software entity, such as runtime software, driver, firmware or other software entity to provide dynamic programming of throttling information, to optimize current sharing between disparate processing circuits of a processor. In this way, performance may be improved in current constrained scenarios.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

One power management logic included in PCU 138 may be a dynamic current sharing control circuit that is configured to dynamically determine independent maximum current consumption values for each core 120 and/or additional processing circuits. As will be described further herein this control circuitry may provide a dynamically configurable maximum current consumption value to each of cores 120 to enable each core 120 to operate according to this constraint. As such, when PCU 138 identifies a condition that triggers a throttle event, a throttle signal may be sent to the cores 120. In turn, each core 120 may limit its operation to its dynamically identified maximum current consumption value. In this way, different cores may operate at asymmetric performance states, particularly when a throttle event is identified, such that a minimal impact to user-facing workloads occurs.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
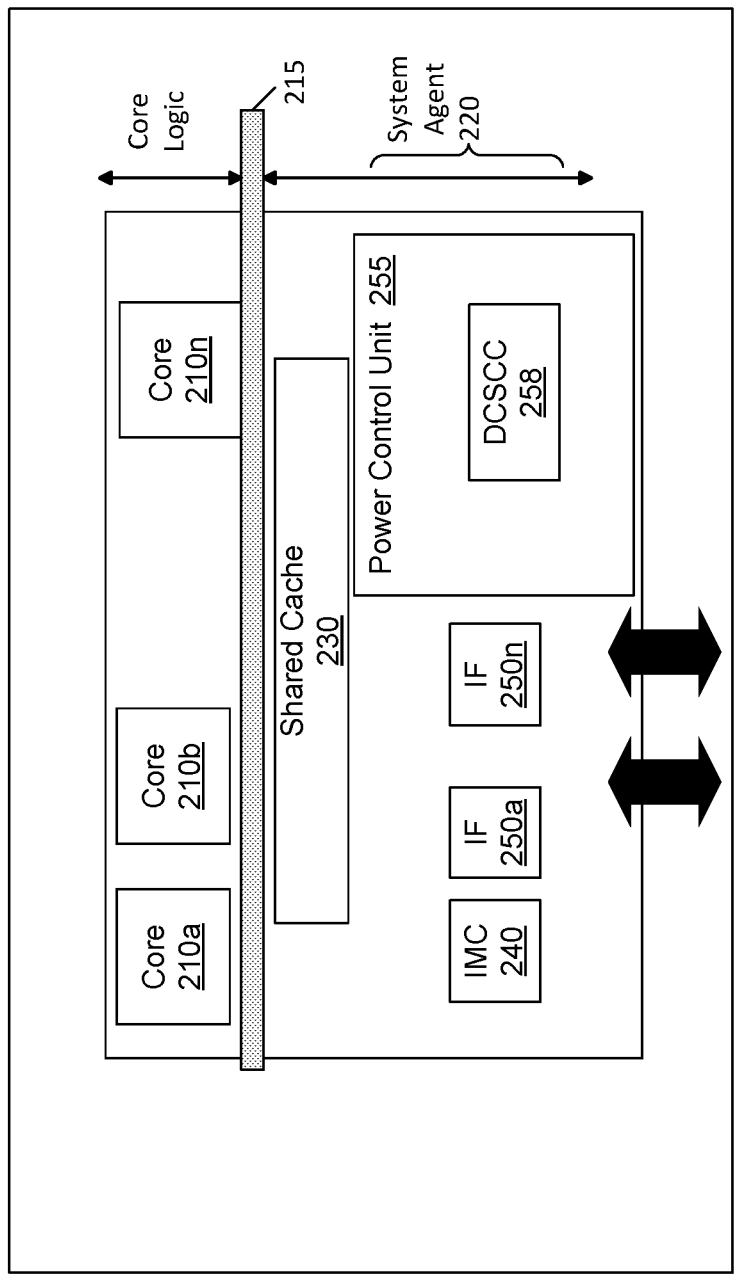
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a dynamic current sharing control circuit 258 that may dynamically determine, based at least in part on software-provided hint information, dynamic current consumption values for each of cores 210. Dynamic current sharing control circuit 258 may communicate such dynamic current consumption values to cores 210 for their storage and internal use to control their current consumption independently, particularly when a throttle event is identified.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
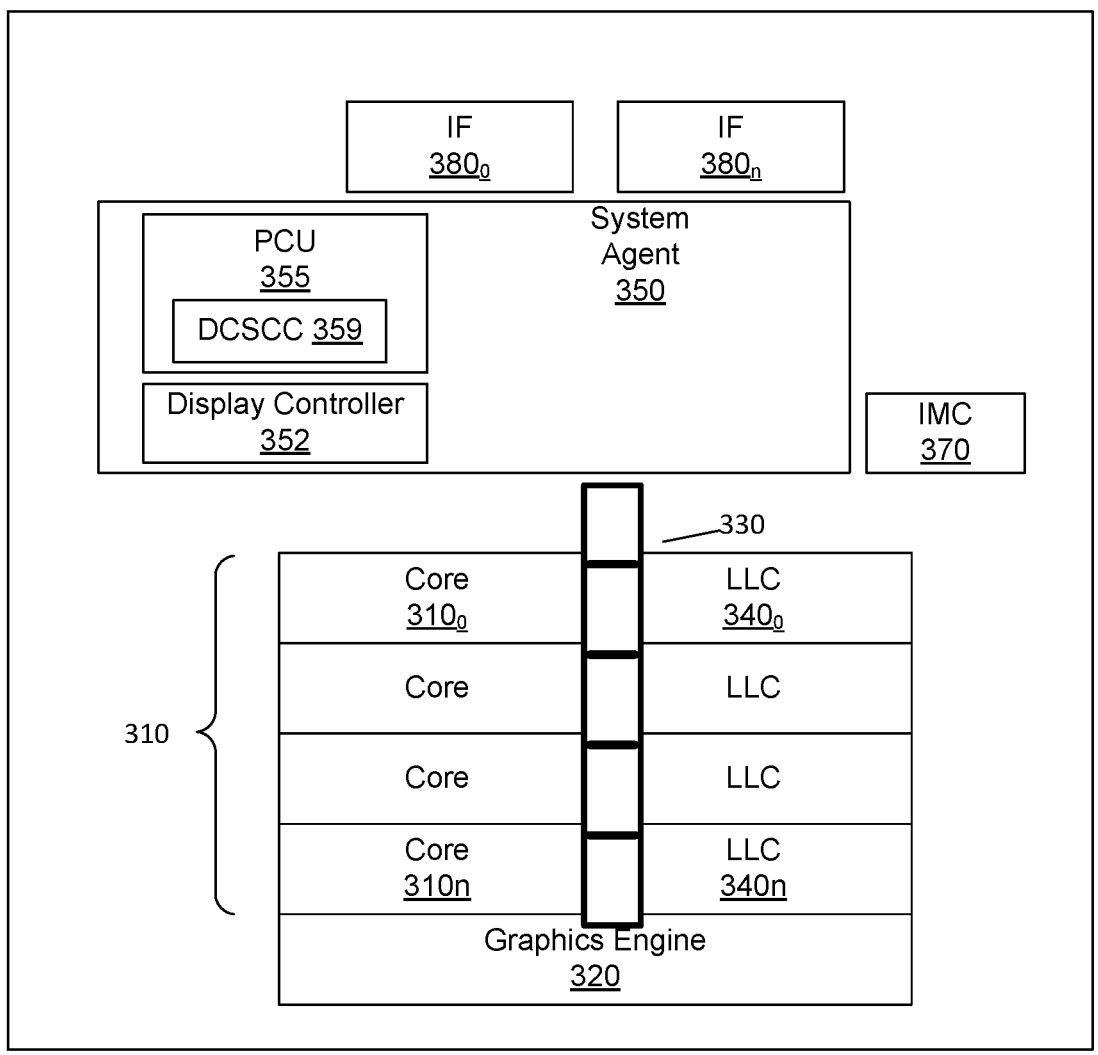
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a dynamic current sharing control circuit 359, which dynamically determines a maximum current consumption level independently for each core 310 and graphics engine 320 based at least in part on hint information provided by software, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
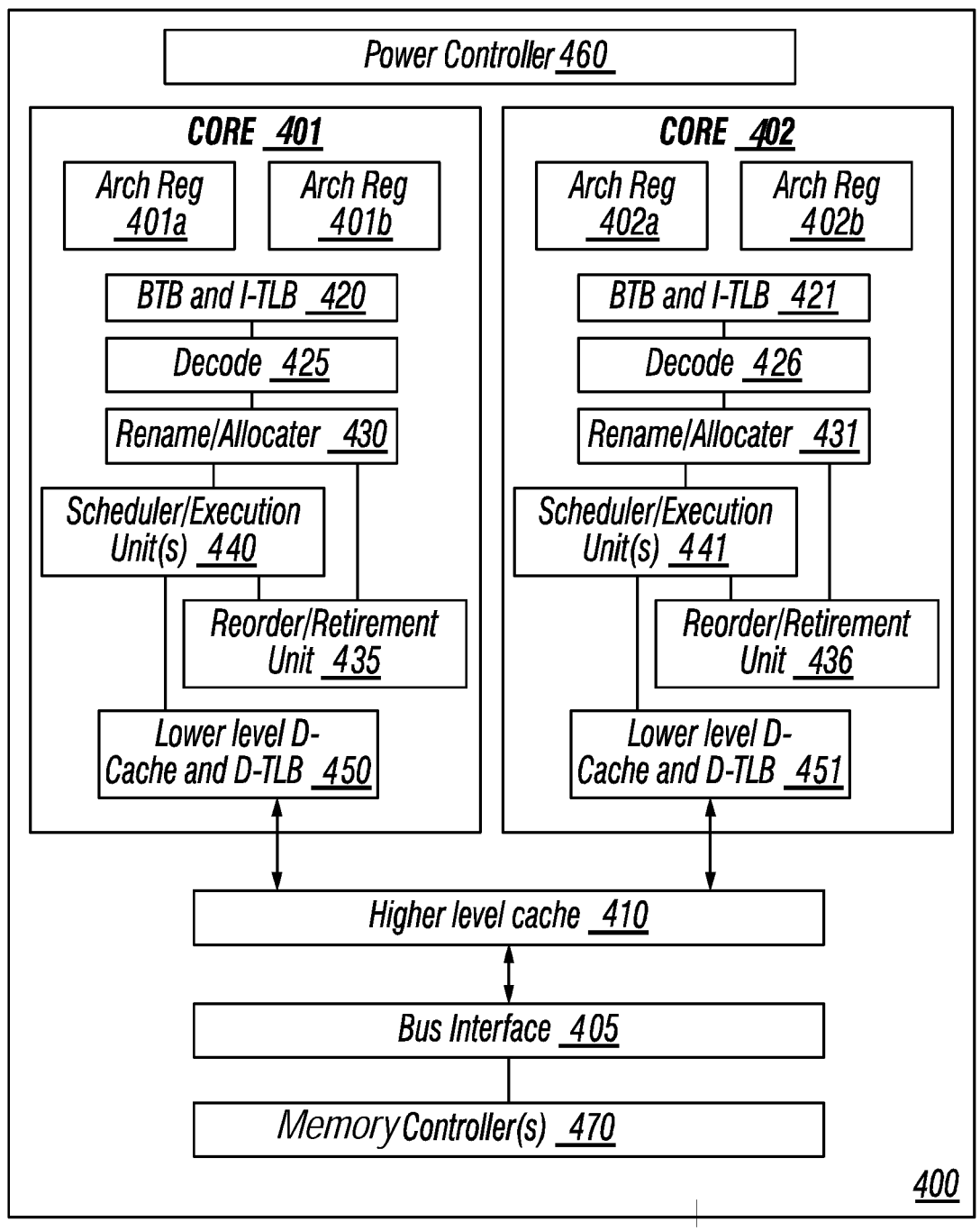
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
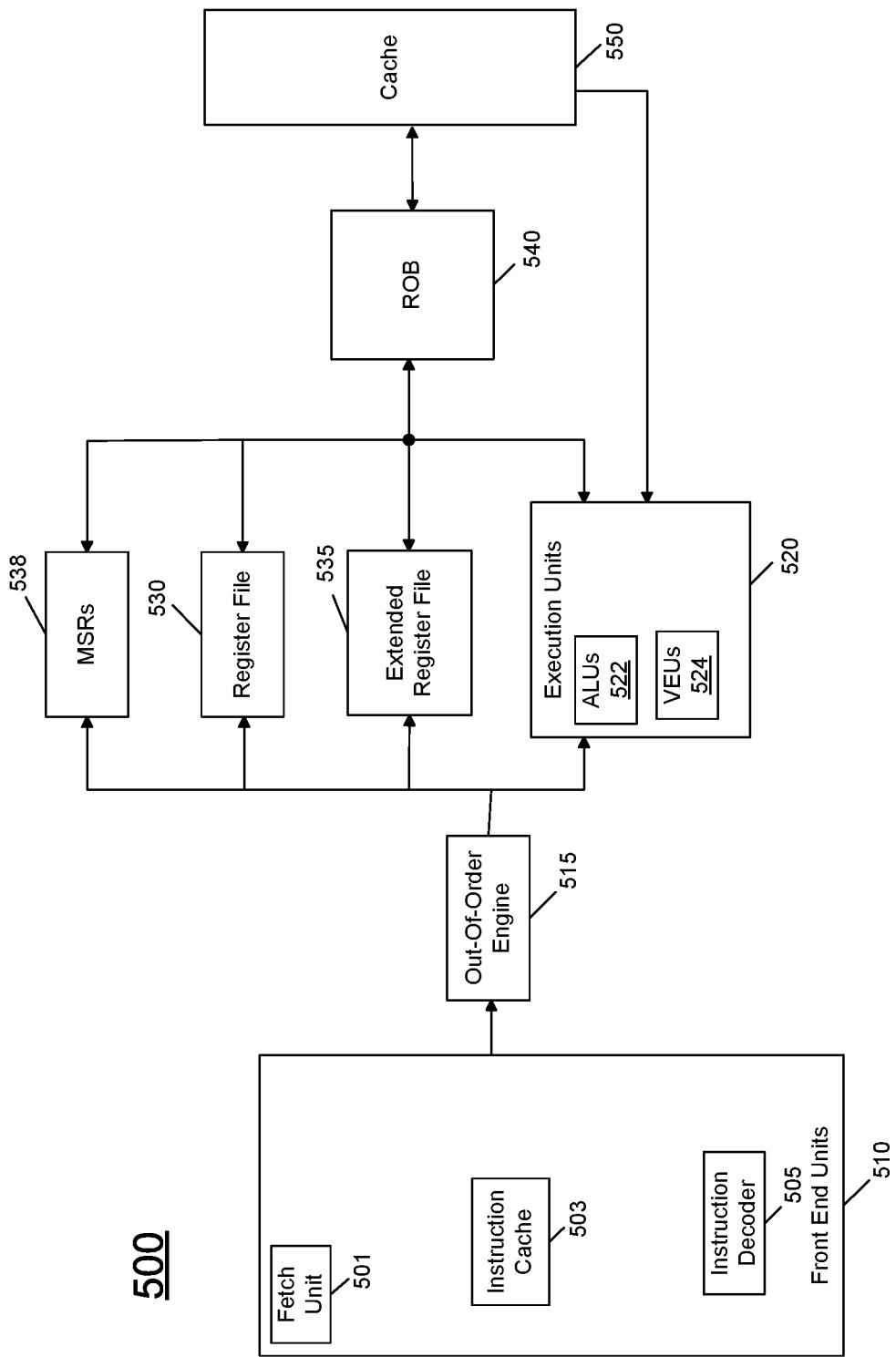
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
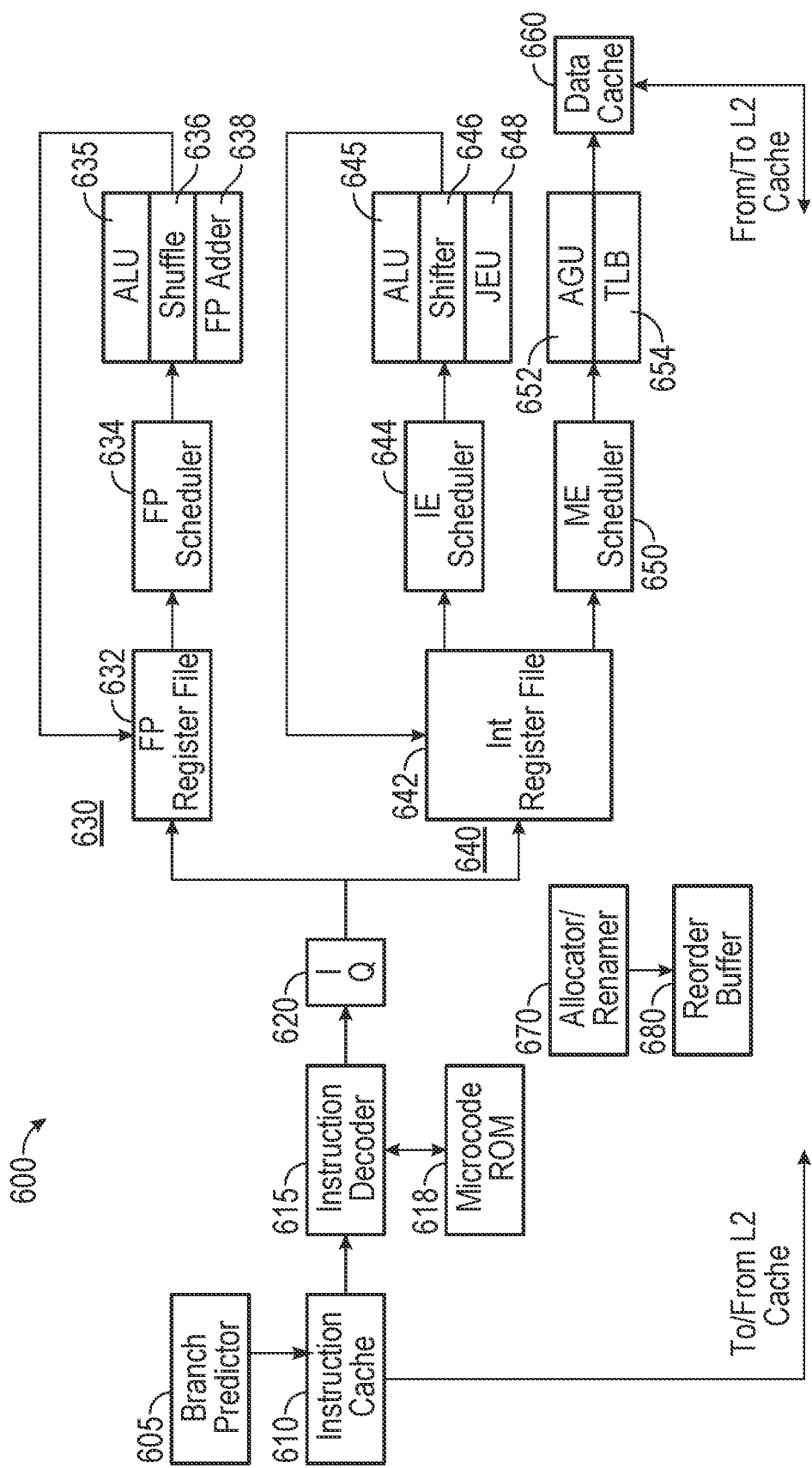
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
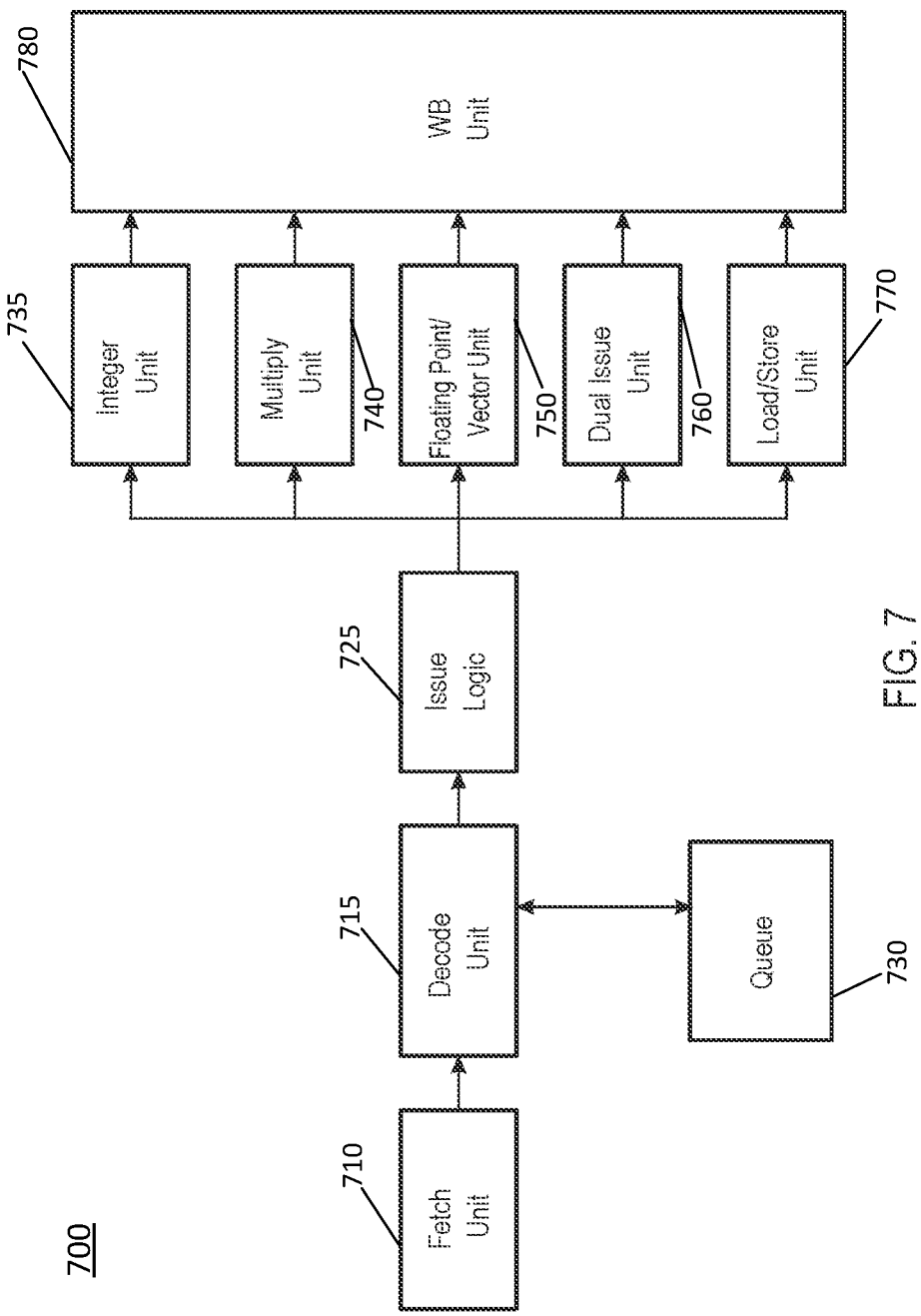
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
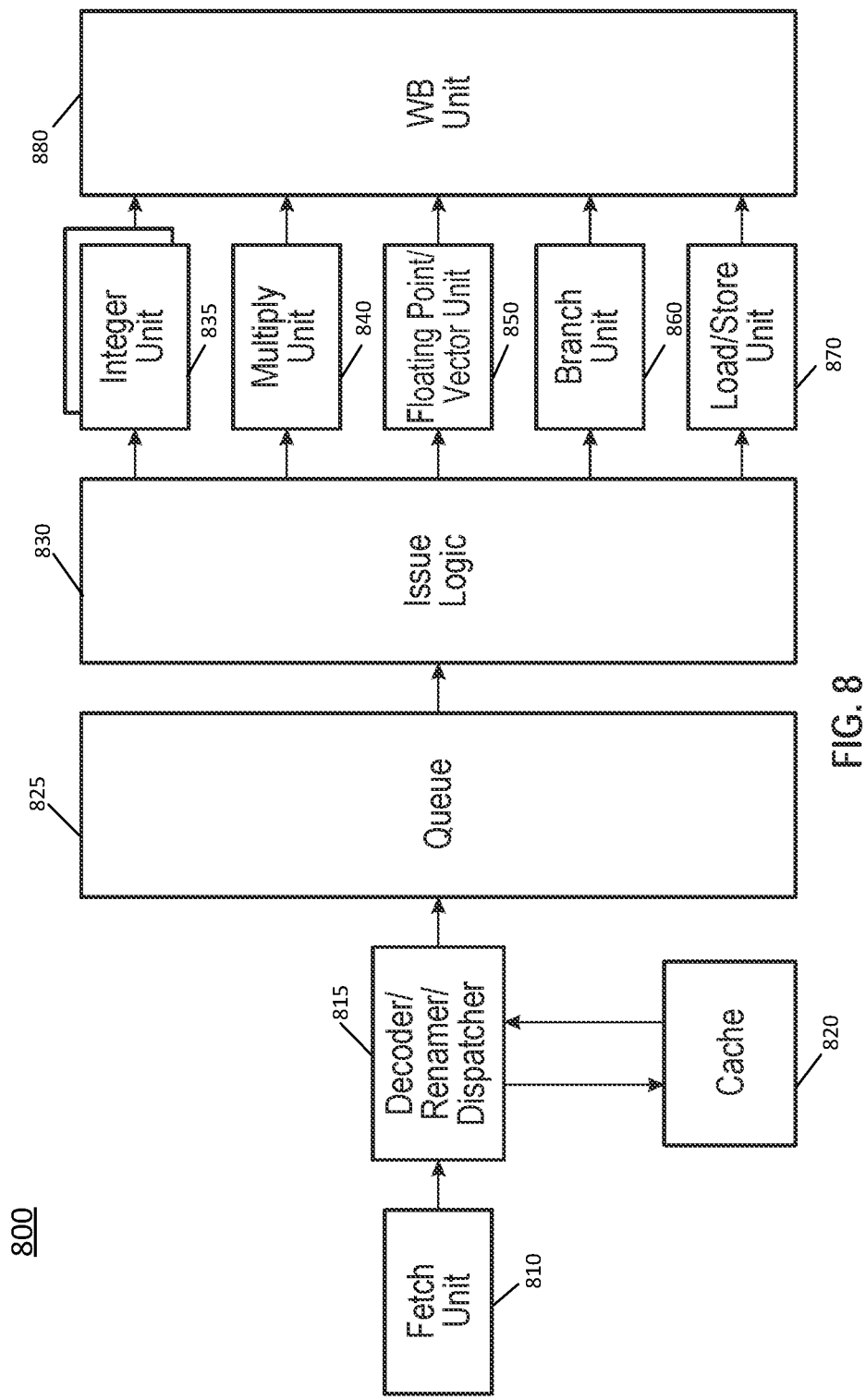
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
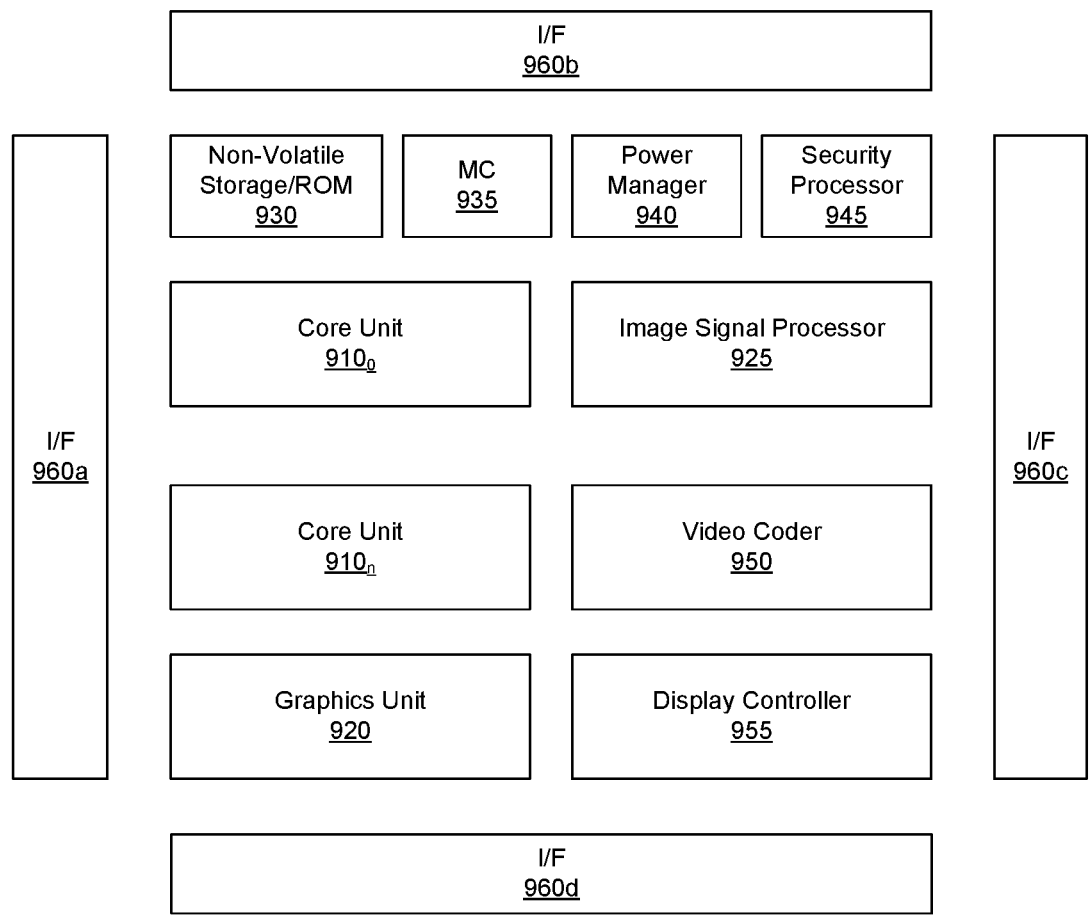
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
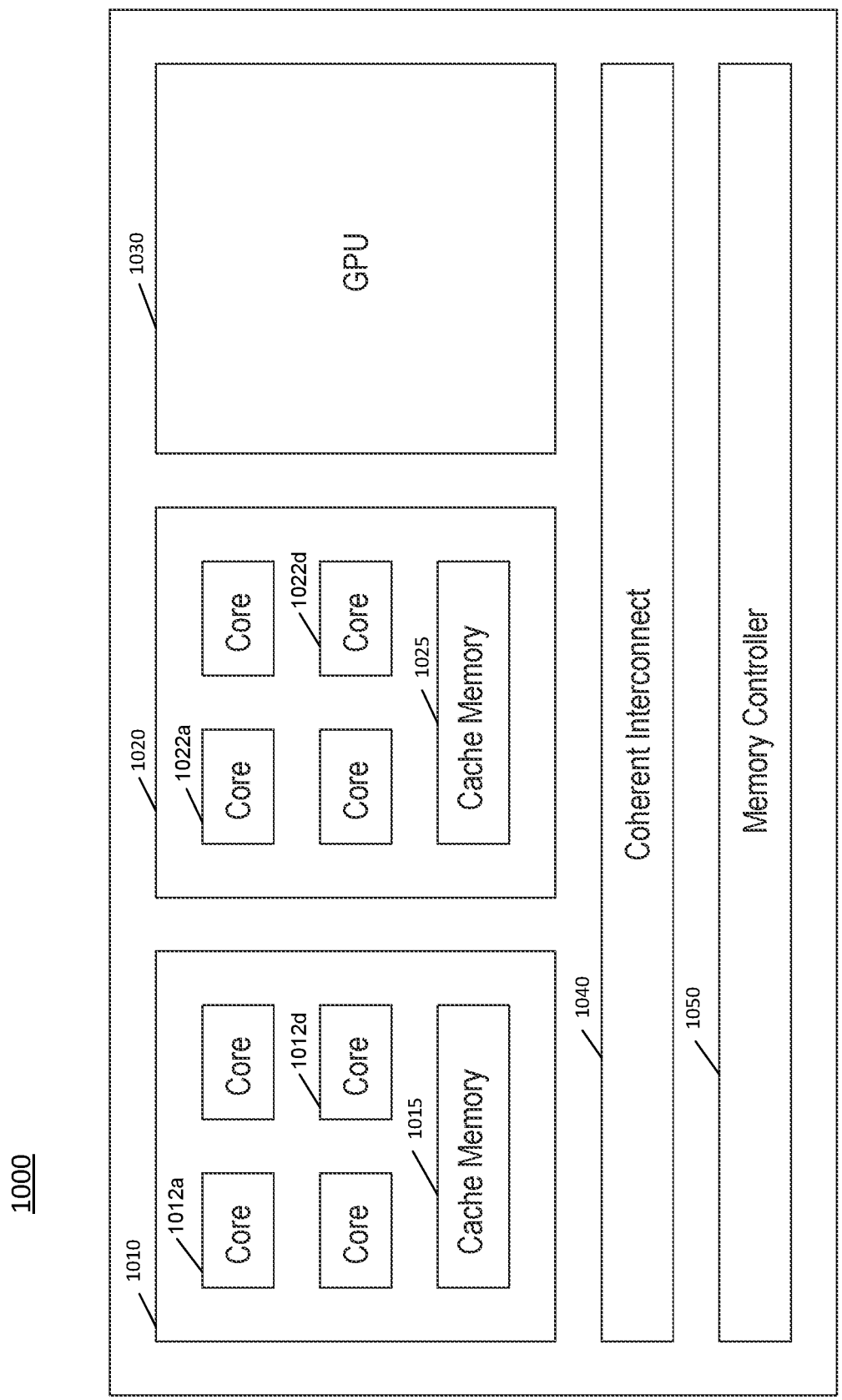
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
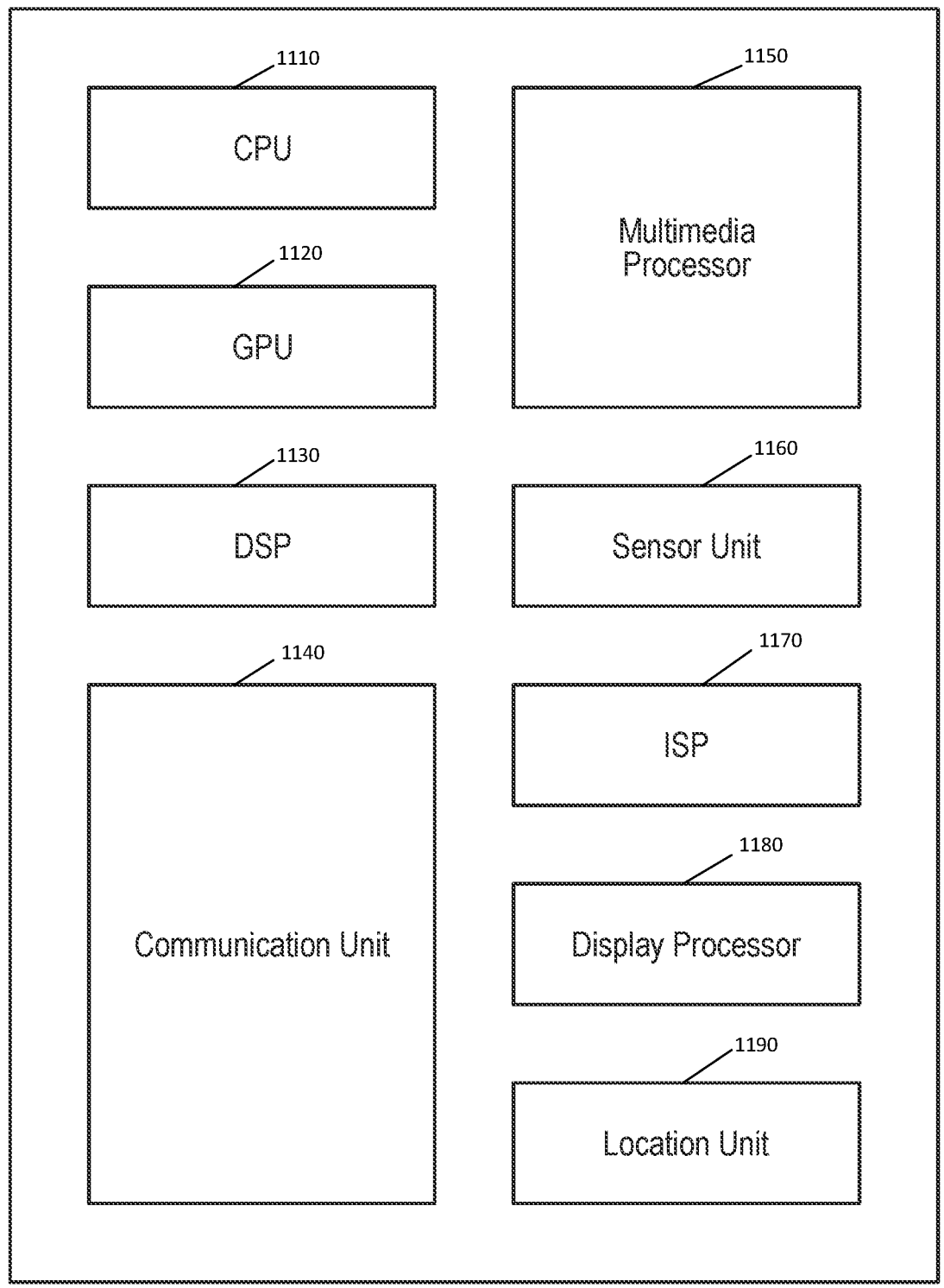
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
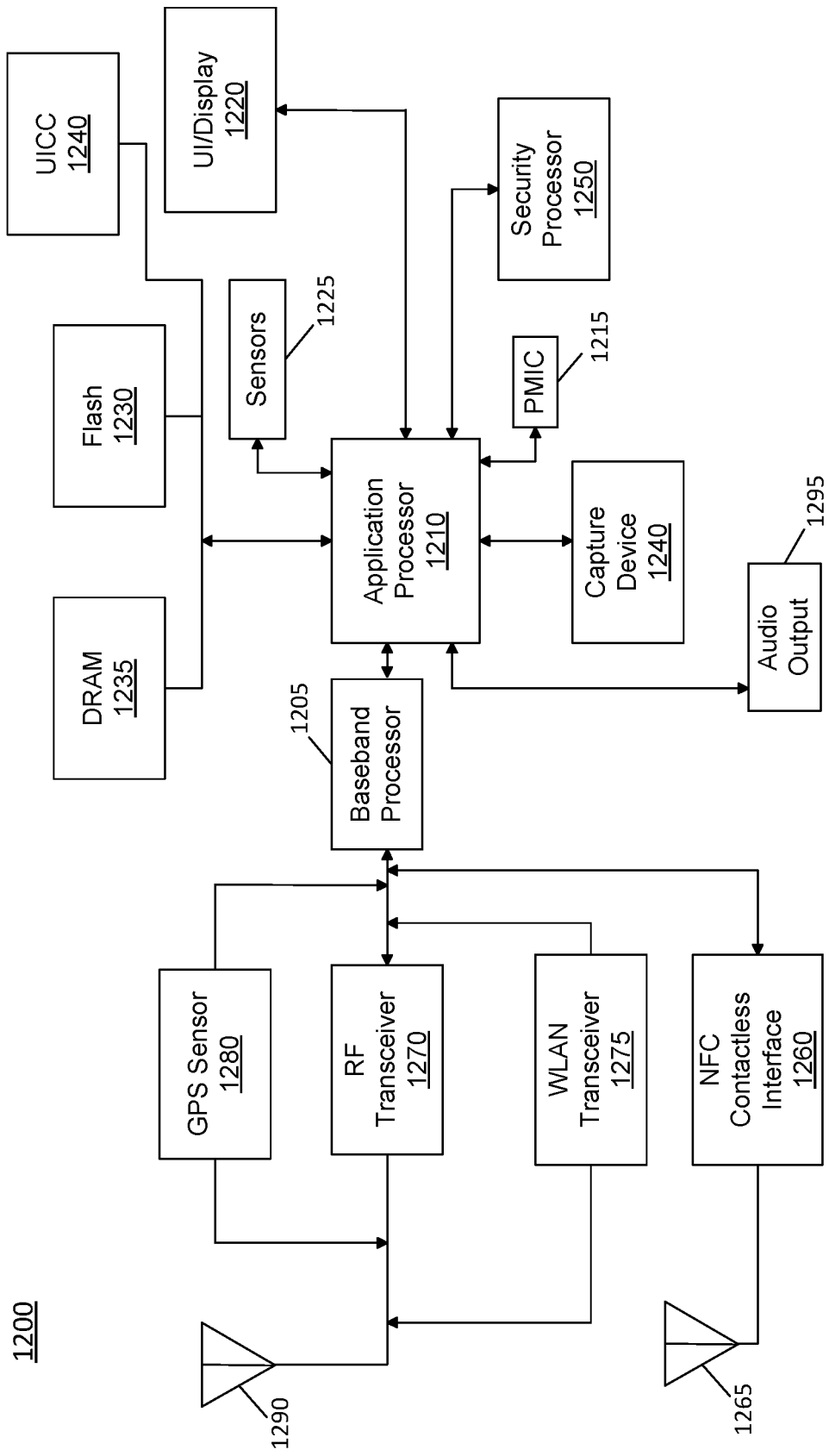
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
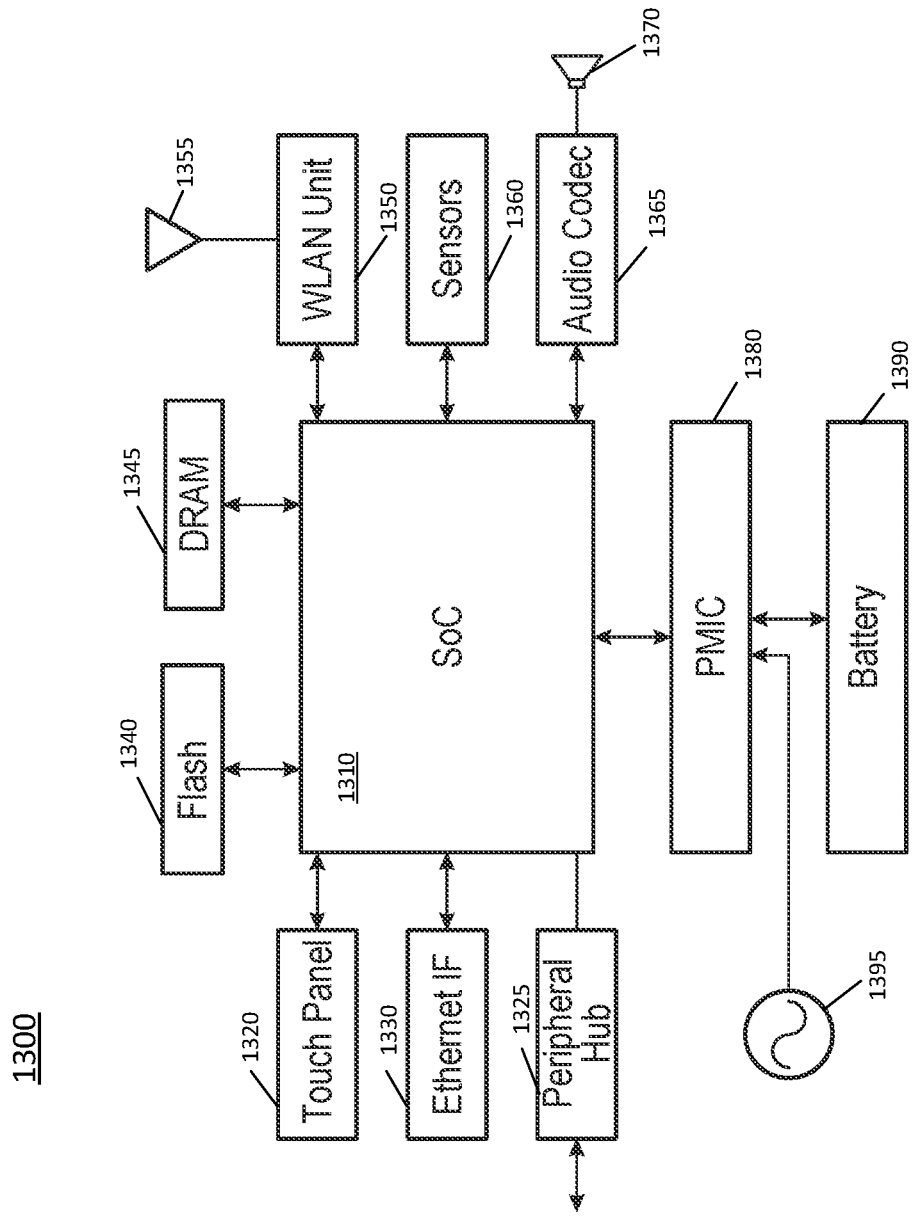
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
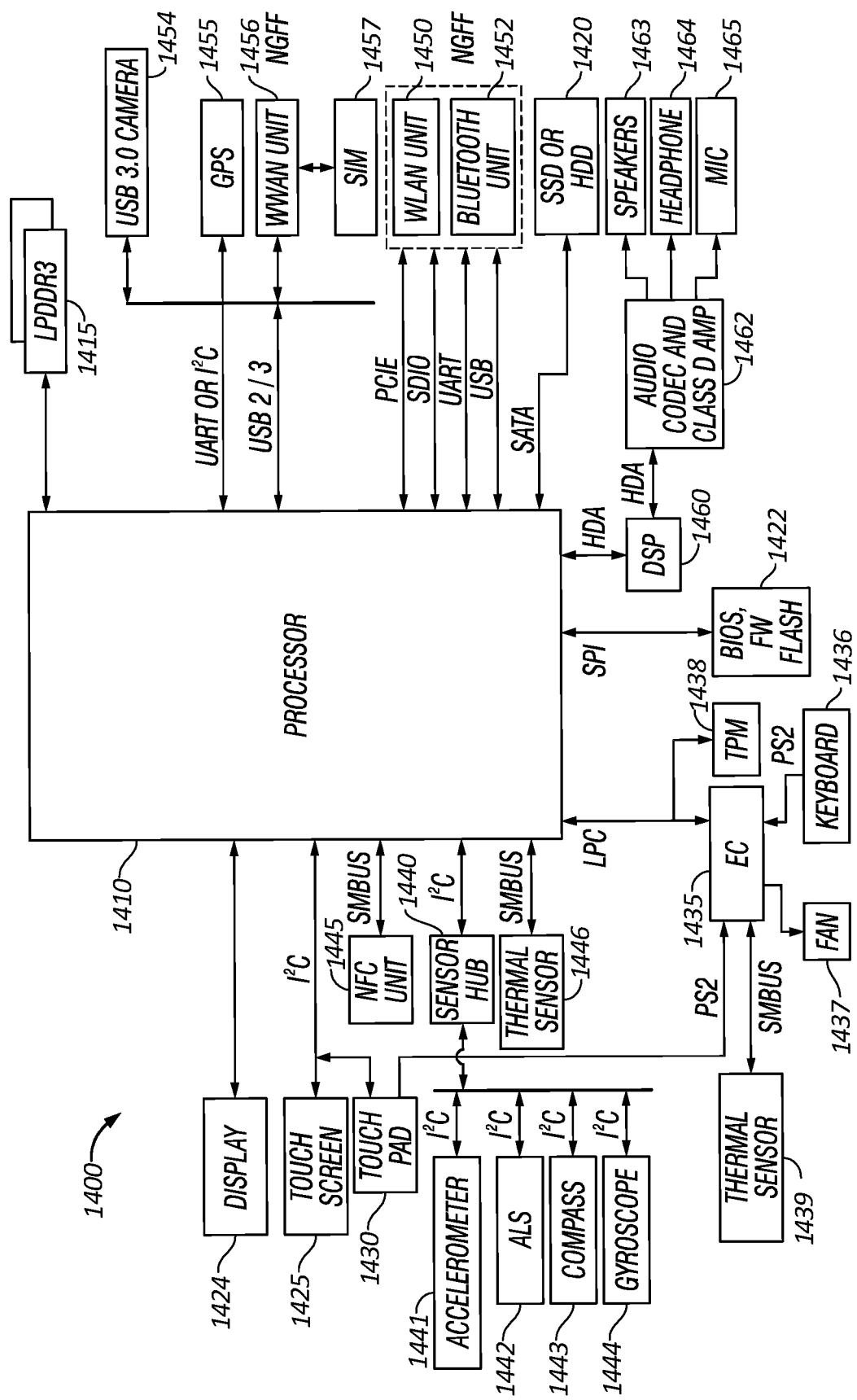
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
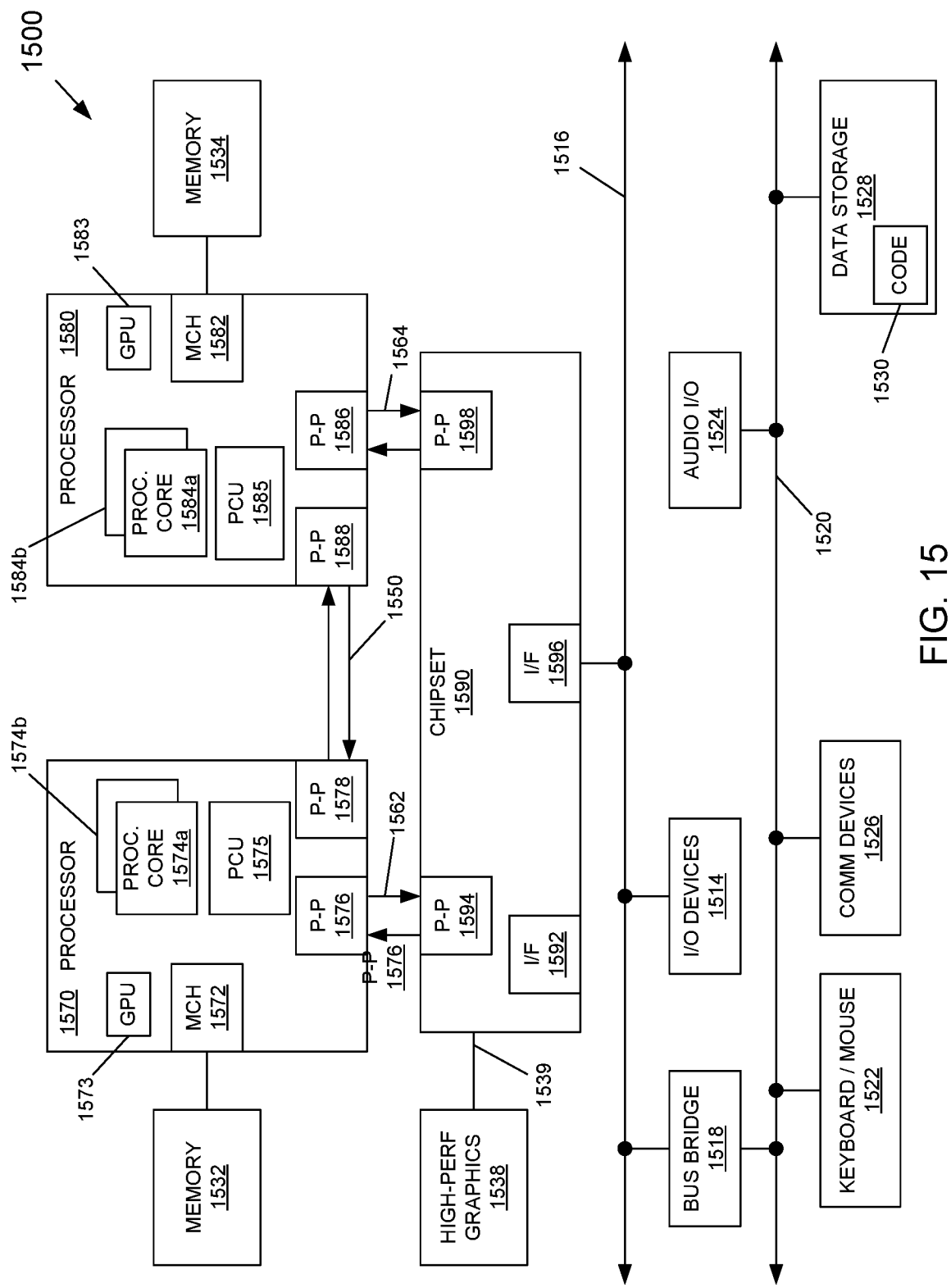
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574*a* and 1574*b* and processor cores 1584*a* and 1584*b*), although potentially many more cores may be present in the processors. In addition, each of processors 1570 and 1580 also may include a graphics processor unit (GPU) 1573, 1583 to perform graphics operations. And with software-provided hint information, e.g., as to priority of processing levels for given workloads between the cores and the GPU, dynamic maximum current determinations and control as described herein may be performed. To this end, each of the processors can include a PCU 1575, 1585 to perform processor-based power management, including dynamic current to dynamically determine a maximum current consumption level individually for each core and GPU based at least in part on hint information provided by software, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
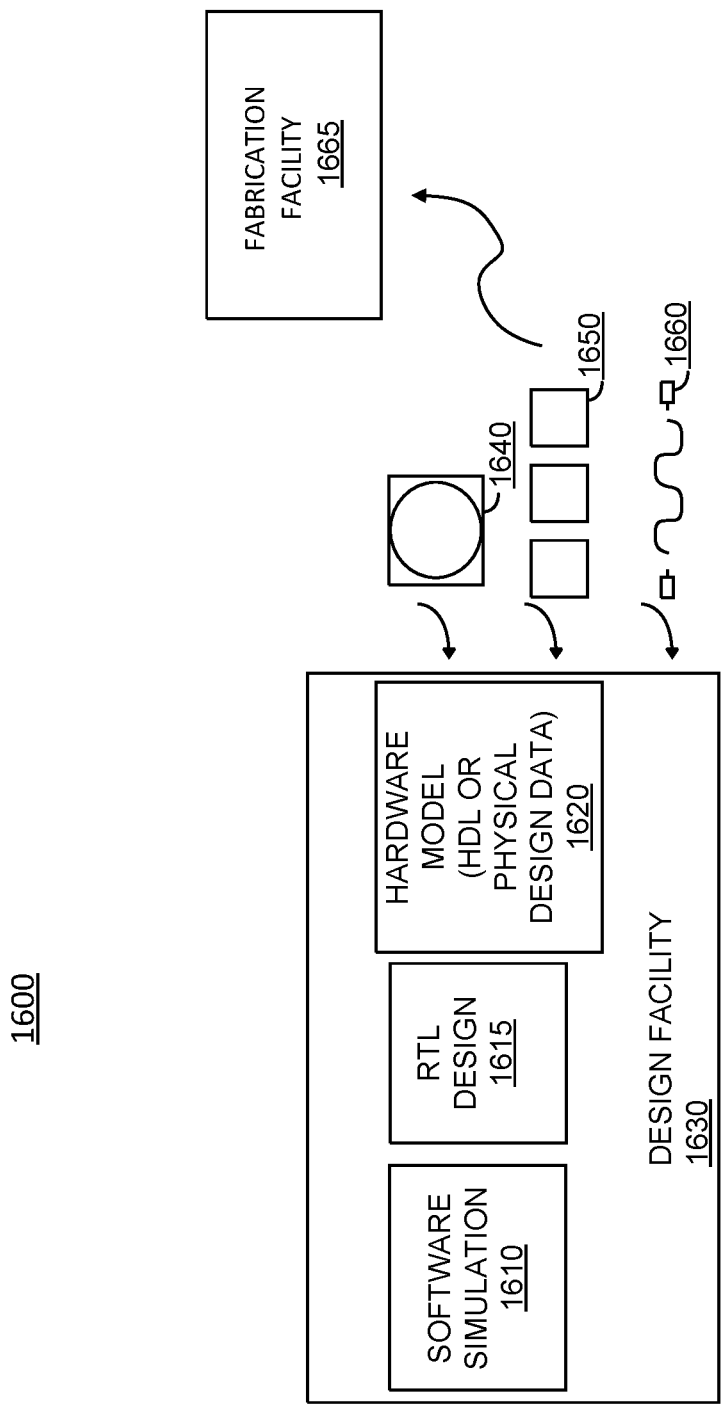
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
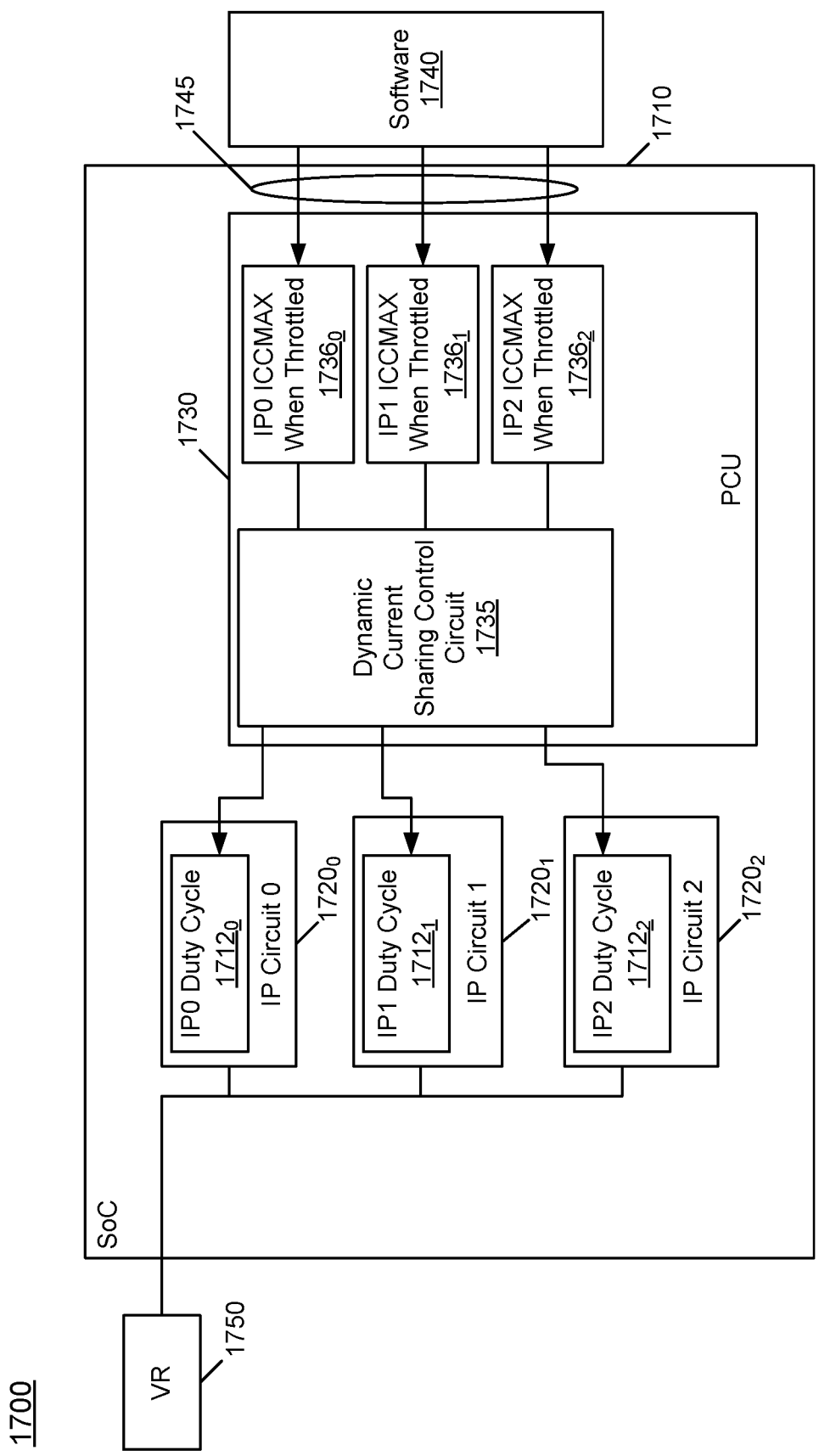
FIG. 17 is a block diagram of a computing system in accordance with an embodiment of the present invention.

Referring now to FIG. 17, shown is a block diagram of a computing system in accordance with an embodiment of the present invention. As shown in FIG. 17, system 1700 may be any type of computing system, ranging from a small portable device such as smartphone, tablet computer or so forth to larger devices, including laptop computers, desktop computers, server computers and so forth.

In any event, in the high level shown in FIG. 17, system 1700 includes a system on chip (SoC) 1710 that may be implemented as a multicore processor or any other type of SoC. Included within SoC 1710 are a plurality of intellectual property (IP) circuits $1720_0$-$1720_2$. In embodiments, each IP circuit 1720 may be a processing core, graphics processor or any other types of homogeneous or heterogeneous processing circuit such as specialized processing units, fixed function units and so forth. In one particular embodiment, assume that IP circuits $1720_{0,1}$ are general-purpose processing cores, and IP circuit $1720_2$ is a graphics processor, which in some cases may be formed of multiple individual graphics processing units.

Depending on particular workloads being executed within SoC 1710, certain processing circuits may be more significant for the workload than others. As such, with embodiments herein the different IP circuits can be allowed a controllable amount of current consumption based at least in part on hint information received from a software 1740, which may provide the workload for execution. By providing this workload, software 1740 has an a priori and greater understanding of the nature of the workload and the significance and likely relative current consumption of different IP circuits. As such, embodiments include an interface 1745 to provide current consumption information based on runtime heuristics from software 1740 to a power control unit (PCU) 1730.

In various embodiments, PCU 1730 may be implemented as a dedicated hardware circuit, one of multiple cores, a microcontroller or any other hardware circuitry. In the embodiment shown, PCU 1730 includes a plurality of configuration registers $1736_0$-$1736_2$. In embodiments, a given configuration register 1736 may be associated with a corresponding IP circuit 1720 to store current throttle information received from software 1740 for the corresponding IP circuit. Note that this information may take different forms in different embodiments. In some cases, such information may be based on priority information and may include a relative priority level, e.g., in terms of percentage, for each IP circuit. In other cases, software 1740 may provide an actual maximum current value to be enforced for the IP circuit in a throttling situation. In yet other embodiments, this information may take other forms.

Still with reference to FIG. 17, PCU 1730 further includes a dynamic current sharing control circuit 1735. In embodiments herein, dynamic current sharing control circuit 1735 may determine resolved maximum current values for each individual IP circuit based at least in part on the information stored in configuration registers 1736. In addition, control circuit 1735 may determine these resolved maximum current values further based on die-specific information, including, as examples, leakage information, process variation information, voltage/frequency curves, and so forth. In this way, dynamic current sharing control circuit 1735 may update the values written by software 1740 based on such information to generate resolved values, from which throttling control values may be determined. These throttling control values may be sent to corresponding IP circuits 1720. As illustrated in FIG. 17, each of processing circuits 1720 includes a configuration storage 1712 to store a corresponding throttling control value. Note that the throttling control value itself may take different forms in different embodiments. In some cases, this throttling control value may be implemented as a duty cycle value. In other cases, the throttling control value may be an allowed maximum current consumption or allowed maximum operating frequency for the IP circuit, or so forth. As described herein, IP circuit 1720 may dynamically control its own operation in a throttling situation based at least in part on this throttling control value stored in configuration storage 1712.

Note that further in the illustration of FIG. 17, a voltage regulator 1750, external to SoC 1720 is present. Voltage regulator (VR) 1750 may provide power to all of the IP circuits $1712_{0\text{-}2}$ illustrated in FIG. 17, as well as other circuitry of SoC 1710. However, understand that in other cases, the control and current sharing realized in embodiments may be performed on a per voltage rail basis. That is, voltage regulator 1750 or additional voltage regulators may be present that provide power by way of multiple independent voltage rails, each coupled to one or more IP circuits and other logic of the processor. In such cases, dynamic current sharing control circuit 1735 may dynamically determine current sharing throttling control values for each collection of IP circuits associated with a given voltage rail.

Still with reference to FIG. 17, assume an implementation in which IP circuits 1720 (also referred to herein as IP1-IP3) respectively draw maximum currents of: maximum IP1.iccmax; Ip2.iccmax; and IP3.iccmax. Also assume VR 1750 can provide a total max current of: VR1.iccmax. In high current VRs such as VR 1750, the VR1.iccmax<IP1.iccmax+IP2.iccmax+IP3.iccmax. This undersizing is done to limit the cost of the VR. To ensure correctness, PCU 1730 may trigger throttling when it detects that a maximum current capacity of voltage regulator 1750 is about to be exceeded. Such throttling may be performed proactively based on a threshold somewhat lower than the actual configured maximum current capability. Understand that while different implementations are possible, in an embodiment throttling can be implemented by gating IP clocks with some duty cycle. The duty cycle of such schemes can be configured by PCU 1730.

In one embodiment, PCU 1730, by way of interface 1745, may receive specific iccmax values to which the IP circuit should be throttled to when an iccmax violation is detected, namely: IP0_ICCMAX_WHEN_THROTTLED; IP1_ICCMAX_WHEN_THROTTLED; IP2_ICCMAX_WHEN_THROTTLED; values to be stored in configuration registers 1736. Software can populate these values based on runtime heuristics, and may ensure that the currents written here are not larger than the VR1.iccmax value.

In turn, PCU 1730, and more specifically dynamic current sharing control circuit 1735, may use die-specific information (e.g., leakage, process variation, V/F curves) to update the values written by software. For this example, assume PCU 1730 considers the software input and the die-specific information, to determine resolved values of:

RESOLVED_IP0_ICCMAX_WHEN_THROTTLED, RESOLVED_IP1_ICCMAX_WHEN_THROTTLED; and RESOLVED_IP2_ICCMAX_WHEN_THROTTLED. Dynamic current sharing control circuit 1735 then may calculate a duty cycle value for throttling the IP circuits based on these final resolved values and configured maximum current values (iccmax). The duty cycle in this case can be calculated as: duty_cycle_ip_n=RESOLVED_IPn_ICCMAX_WHEN_THROTTLED/IPN.iccmax. For IP0, this results in a duty_cycle_ip_0=RESOLVED_IP0_ICCMAX_WHEN_THROTTLED/IP0.iccmax.

PCU 1730 can then program the duty cycles for throttling within configuration registers 1712. Depending on platform/SoC level heuristics, the IP_N_ICCMAX_WHEN_THROTTLED value can be changed to get optimal runtime behavior.

As one particular example, assume a graphics-intensive workload, in which IP circuit $1720_2$ is a graphics processor and IP circuits $1720_{0,\,1}$ are general-purpose processors. In this arrangement, a graphics driver may, via interface 1745, provide hint information to indicate that the graphics processor (and interconnect circuitry) should be provided their maximum configured current consumption, while cores can be throttled. To this end, the graphics driver may provide configured maximum current consumption values for the graphics processor and interconnect, and a remaining current budget can be allocated to the cores. In this way, when a maximum current consumption limit is hit, the cores may be throttled but the graphics processor and interconnect may continue to run unconstrained, improving graphics workloads.

In another case with a core compute-intensive workload, the opposite behavior can occur by allocating maximum current consumption values for the cores and interconnect and remaining current consumption budget to graphics processors. In this way, when a power spike is identified, a graphics processor can be throttled, but cores and interconnect may still operate unconstrained, improving core-based workloads. In one embodiment, software may leverage utilization information to identify core or graphics-bound workloads. Understand while shown at this high level in the embodiment of FIG. 17, many variations and alternatives are possible.

Figure 18:
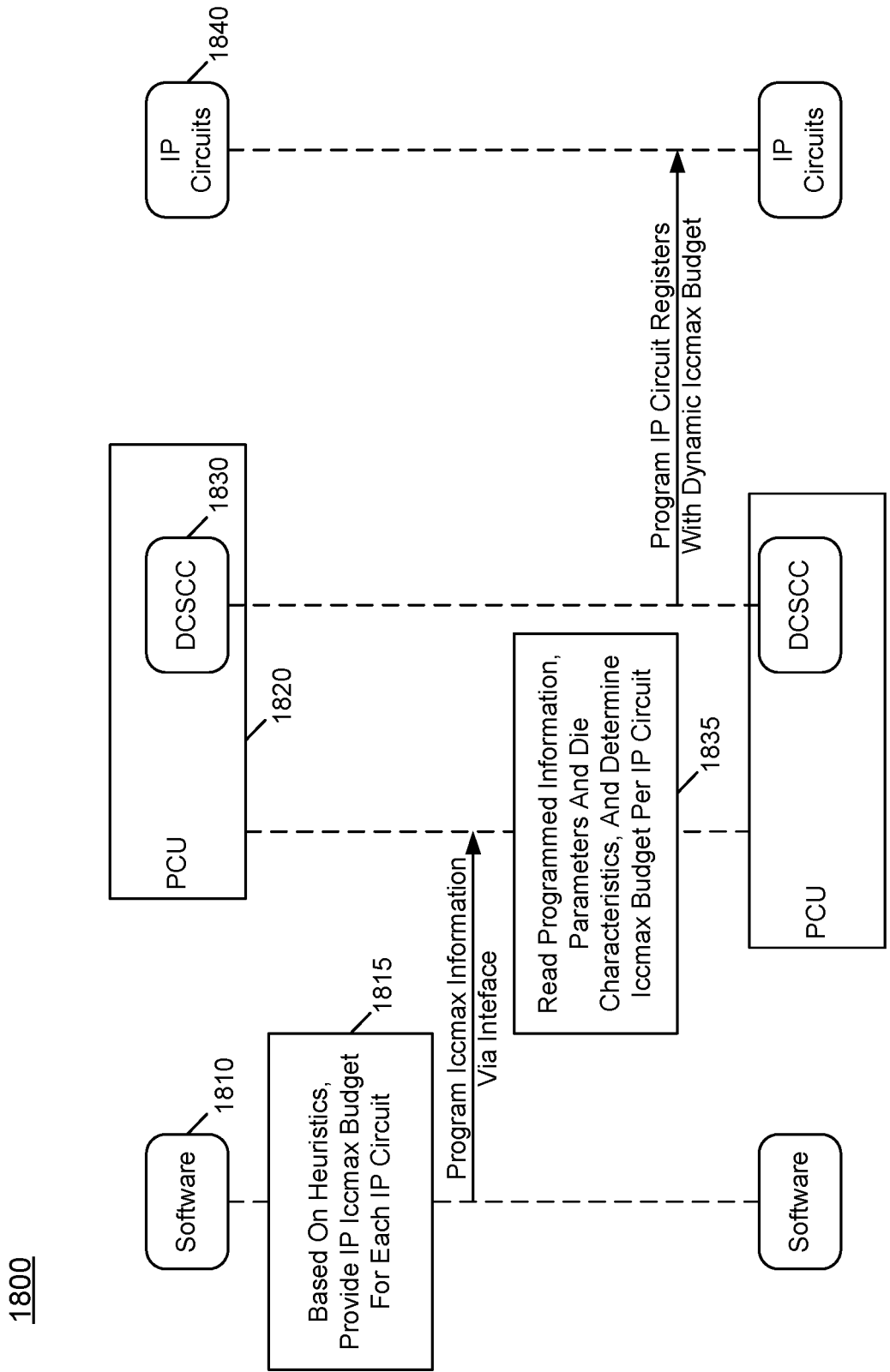
FIG. 18 is a flow diagram of a method in accordance with an embodiment of the present invention.

Referring now to FIG. 18, shown is a flow diagram of a method in accordance with an embodiment of the present invention. As shown in FIG. 18, method 1800 is a method for performing dynamic current sharing between multiple IP circuits based at least in part on software-based information regarding workloads being executed. More specifically, method 1800 may be performed in concert between various agents, including software having a workload to be executed and corresponding hardware, including a hardware-based power controller and one or more IP circuits on which at least portions of the workload may execute. As such, method 1800 may be performed by hardware circuitry, firmware, software and/or combinations thereof.

As illustrated, in method 1800 a software agent 1810 may have a workload to execute and may determine (block 1815) based on heuristics a per IP circuit maximum current budget (and/or a maximum current priority) for each such IP circuit. As illustrated, software 1810 may provide this information via an interface to a power controller 1820, which may store this information in corresponding configuration registers, namely current throttling configuration registers. In turn, PCU 1820, and more particularly a dynamic current sharing control circuit 1830, may read this information, and based on this information and die parameters and characteristics, determine a maximum current budget per IP circuit. Power controller 1820 may then send this information for programming corresponding configuration registers of IP circuits 1840. Then, during operation of the workload, when power controller 1820 proactively identifies a maximum current situation, it sends a throttling signal to IP circuits 1840. In turn, IP circuits 1840 may throttle operation to remain within the maximum current budget identified in its configuration registers. Understand while shown at this high level in the embodiment of FIG. 18, many variations and alternatives are possible.

Figure 19:
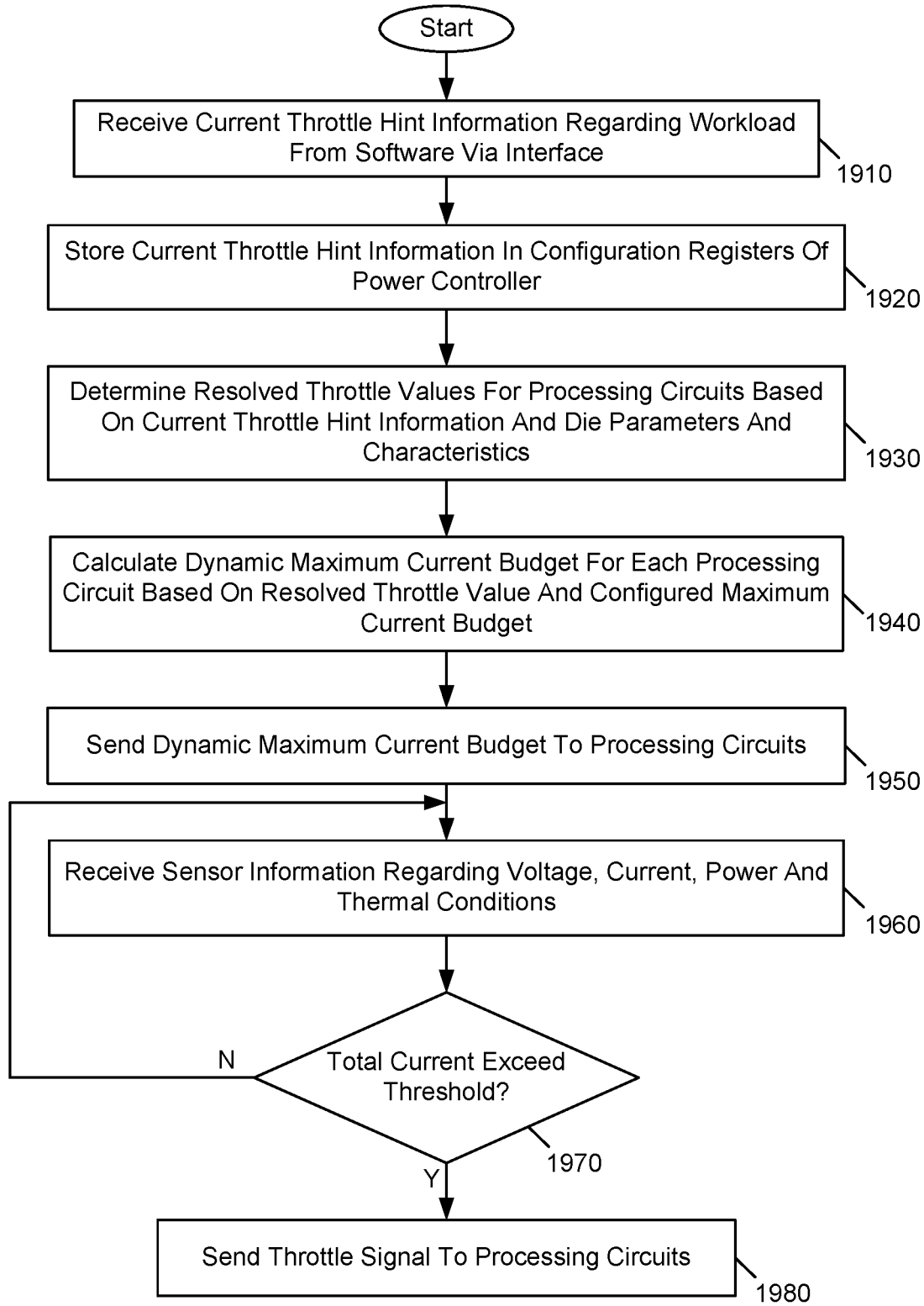
FIG. 19 is a flow diagram of a method in accordance with one embodiment of the present invention.

Referring now to FIG. 19, shown is a flow diagram of a method in accordance with one embodiment of the present invention. As shown in FIG. 19, method 1900 is a method for interfacing between a power controller and a software entity that has a priori knowledge of workload to be executed. Method 1900 in FIG. 19 is from the view of the power controller, and as such, method 1900 may be performed by hardware circuitry, firmware, software and/or combinations thereof.

As shown in FIG. 19, method 1900 begins by receiving current throttle hint information regarding a workload (block 1910). More specifically, the power controller may receive this hint information from a software entity via an interface. Although different embodiments are possible, in one embodiment the interface that may be a mailbox interface of the power controller to which the software entity may write. In another embodiment, a software entity may perform a configuration register write, such as a write to machine specific register (MSR) operation to provide this current throttle hint information. Note that the current throttle hint information may take various forms, including priority information for different processing circuits, such as in the form of percentages or so forth.

At block 1920, the power controller stores this current throttle hint information into a set of configuration registers of the power controller. Next at block 1930 the power controller may determine resolved throttle values for the processing circuits. More specifically, these resolved throttle values may be based on the current throttle hint information and various parameters of the processor, including die-based parameters and characteristics of operation, such as voltage/frequency curves and so forth. In some cases, the power controller may overwrite the current throttle hint information present in the configuration registers with these resolved throttle values. In other cases, the resolved throttle values may be stored in another location.

In any event, control next passes to block 1940 where a dynamic maximum current budget may be calculated for each processing circuit. Such calculated current budget may be based on the resolved throttle value for a given processing circuit and a configured maximum current budget for the processor. To this end, the power controller may include or may be associated with another set of configuration registers that store a maximum current budget for each processing circuit. Note that this configured maximum current information may be stored during a pre-boot environment, such as by a given firmware.

Still referring to FIG. 19, at block 1950 the dynamic maximum current budgets can be sent to the processing circuits. Understand that in response to receipt of a given maximum dynamic maximum current budget, a processing circuit may store such value in a configuration register, and may control operation to be maintained equal to or lower than this dynamic maximum current budget, when a throttle condition is identified. Note that these dynamic maximum current budgets are relevant only during throttle events. That is, a given processing circuit may be allowed to exceed its programmed maximum current budget during normal operation, but obey the limit during a throttling condition Still referring to FIG. 19, during normal operation of the processor, the power controller may receive various telemetry or sensor information. Specifically, as illustrated in block 1960 such information may regard voltage, current, power and thermal conditions of the processor. As part of its power control operations, the power controller may determine, at diamond 1970, whether the total current consumption of the processor exceeds a given threshold. Note that this threshold may be set at a value lower than a configured maximum current consumption of the processor, so that proactive control of current consumption may occur.

If it is determined that the total current exceeds this threshold value, control passes to block 1980 where a throttle signal may be sent to the processing circuits. In response to receipt of this throttle signal, processing circuits may control their operation to ensure that their current consumption does not exceed the dynamic maximum current budget. In this way, each of the processing circuits may operate with an independent and a dynamically controllable current consumption level, to improve workload execution, even when the throttle condition is identified. This is so, as by independently controlling current consumption levels dynamically based on relative priority of given processing circuits, processing circuits integral to a particular workload may not be throttled at all, or at minimum, may be throttled less than other (less integral) processing circuits, during such workload execution. Understand while shown at this high level in the embodiment of FIG. 19, many variations and alternatives are possible.

Figure 20:
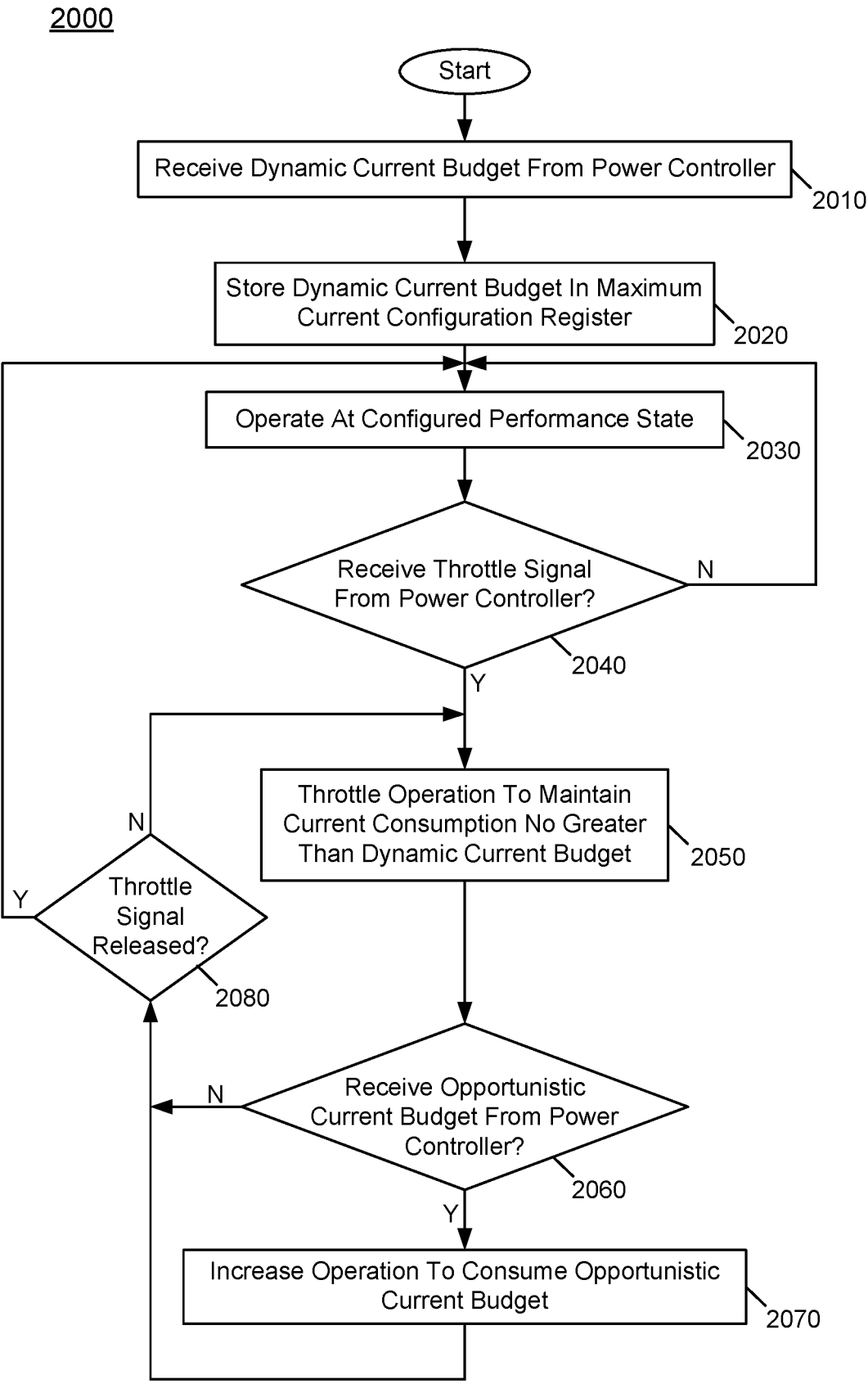
FIG. 20 is a flow diagram of a method in accordance with another embodiment of the present invention.

Referring now to FIG. 20, shown is a flow diagram of a method in accordance with another embodiment of the present invention. As shown in FIG. 20, method 2000 is a method for dynamically controlling current consumption within a processing circuit based on a dynamic current budget. As such, method 2000 may be performed by hardware circuitry such as a processing core, graphics processor or other processing circuit, or firmware, software and/or combinations thereof that execute on such circuitry.

Method 2000 begins by receiving a dynamic current budget from a power controller (block 2010). Note that this dynamic current budget may take different forms in various implementations including in the form of duty cycle information, as described herein. Regardless of the form, at block 2020 the processing circuit stores this dynamic current budget in a maximum current configuration register. Thereafter, the processing circuit may begin (or continue) operation at a configured performance state (block 2030). For example, the processing circuit may be configured under control of a power controller or other control circuitry to operate at a performance state having a given operating frequency and operating voltage. During operation at this configured performance state, it may be determined at diamond 2040 whether a throttle signal is received from the power controller.

In this condition, control passes to block 2050 where the processing circuit may throttle its operation. More specifically, the processing circuit may control its operation to maintain its current consumption to be no greater than the dynamic current budget. In some cases, a processing circuit may include an internal power control logic that may determine operating parameter changes to effect this current consumption maintenance. As one example, the processing circuit may throttle operation by squashing some number of clock signals, such that operation is slowed, and thus current consumption is reduced by operating at a squashed clock, rather than a configured operating frequency. For example, every other clock cycle may be squashed, or other duty cycle control or diminishment in clock cycles can occur.

Note that in certain circumstances where other processing circuits do not consume their full current consumption levels, it is possible that the processing circuit may receive an opportunistic current budget from the power controller. Thus at diamond 2060 it is determined whether an opportunistic current budget has been received. If not, the processing circuit may continue to operate in a throttle condition until it receives a release of the throttle signal (as determined at diamond 2080).

Instead if an opportunistic current budget is received, control passes to block 2070 where the processing circuit may increase its operation. For example, the processing circuit may terminate clock squashing to consume the opportunistic current budget. Understand while shown at this high level in the embodiment of FIG. 20, many variations and alternatives are possible.

In some situations, some cores or other processing circuits may operate with high current consumption. In an arrangement in which all cores or other processing circuits are allocated equal amounts of an overall package current budget, a performance loss may inhere, as any core operating above an allocated current limit would be throttled, via internal or local control operation. Yet at the same time with one or more other cores or processing circuits operating at levels below their allocated current limits, current headroom is left unused.

To avoid this concern, embodiments may provide performance optimizations within a platform having a constrained power delivery solution. To this end, embodiments may implement control techniques with global current control such that one or more cores or other processing circuits are allowed to exceed their individual threshold level, so long as an overall current limit for the package is not exceeded. In this way, embodiments may enhance performance, as some cores or other processing circuits may operate at higher (than configured) current consumption levels while the overall processor maintains operation within limits.

To this end, embodiments may perform fast current sensing on a load side (e.g., as implemented within integrated voltage regulators) to provide a high speed measure of actual current consumption. This measure of current consumption may be output from the integrated voltage regulators as a digital output. In turn, the individual current values from multiple voltage regulators may then be summed. This summed value next may be subjected to digital filtering. In turn, the resulting filtered value is compared to a threshold. Assuming the overall current consumption represented by this filtered value is less than this threshold, no throttling may occur. Should the overall current consumption represented by the filtered value exceed the threshold, one or more domains may be throttled to stay within the limit. Note that this throttling may be performed independently in each domain (or not) based on each domain's actual current consumption and its individual configured limit, as described herein. And as further discussed above, each domain may perform different throttle operations such as clock squashing or otherwise controlling operating frequency, operating voltage or so forth.

With embodiments, actual current consumption may be detected without maintaining a detailed model. As a result, multiple domains may be scaled and a time constant may be adapted to minimize unnecessary throttling. Still further, embodiments enable such performance optimization without any run time adaptation of the system. Further as described herein, embodiments may be extended to multiple external voltage regulators by converting current to power and summing the results of the contribution of such multiple voltage regulators. Embodiments also may be used for more complicated power delivery limitations such as suppression of energy in resonant frequencies to improve minimal operating voltage performance.

Figure 21:
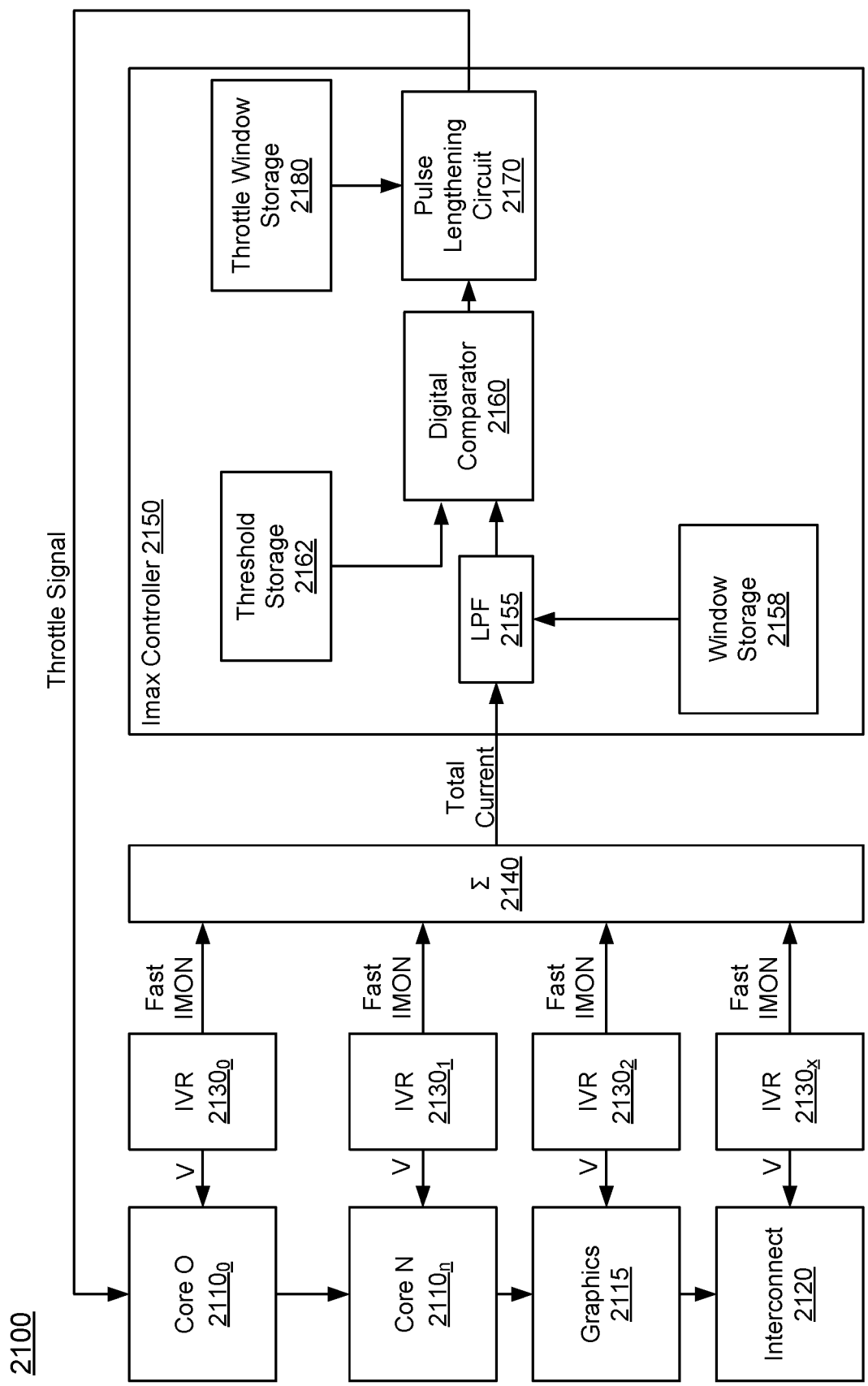
FIG. 21 is a block diagram of a processor in accordance with an embodiment of the present invention.

Referring now to FIG. 21, shown is a block diagram of a processor in accordance with an embodiment of the present invention. As shown in FIG. 21, processor 2100 is a multicore processor including a plurality of cores $2110_0$-$2110_n$. Additional processing engines may be present, including a graphics engine 2115. An interconnect 2120 such as a ring interconnect may be present and used to couple cores 2110 and other components together. As shown in the embodiment of FIG. 21, each of these domains may receive power from a given integrated voltage regulator $2130_0$-$2130_x$. Based on the load presented by these domains, voltage regulators 2130 may measure a real time digital current (using a circuit that operates at high speed (e.g. 400 MHz)). In turn, each integrated voltage regulator 2130 provides a digital current value to a summation circuit 2140, which sums these values into a total current value. Note that in some embodiments, summation circuit 2140 may be implemented in a distributed manner.

Still referring to FIG. 21, this total current value is provided to a current controller 2150. In different embodiments, controller 2150 may be implemented as a dedicated circuit, separate from both cores 2110 and a power controller of the processor (not shown for ease of illustration in FIG. 21). In other cases, controller 2150 may be implemented within the power controller. In any case, as illustrated controller 2150 provides the received total current value to a filter 2155, which in an embodiment may be implemented as a low pass filter to perform digital filtering of this total current value. This filter operation may be performed according to an average time window stored in a window storage 2158. In one embodiment, this time value causes low pass filter 2155 to operate as a 20 nanosecond low pass filter. The filtered current value is provided to a digital comparator 2160, which performs a comparison to a threshold current value stored in a threshold storage 2162. If it is determined that the filtered measured current value exceeds the threshold value, a throttle situation is thus identified and is communicated to a pulse lengthening circuit 2170, which may issue a throttle signal to the various domains according to a throttle window duration provided by a throttle window storage 2180. In other cases, the low pass filters may be replaced with band pass filters to reduce energy in resonant frequency bands.

In embodiments, pulse lengthening circuit 2170 may be configured to reduce ringing or hysteresis of the control mechanism. That is, pulse lengthening circuit 2170 may cause the throttle signal to be active for a given throttle window duration following a detection of a throttle event (identified when the filtered measured current value exceeds the threshold value). Even when throttling begins according to this event and then the measured current falls below the threshold value (as a result of throttle operation occurring in one or more cores or other processing circuits), pulse lengthening circuit 2170 maintains the active throttle signal for at least the length of the throttle window duration to avoid hysteresis or ringing. In different embodiments, the length of this throttle window duration may be programmable, and in some embodiments, pulse lengthening circuit 2170 may be an optional component. That is, in other cases, a hysteresis or other control scheme may be applied to the throttle signal. Understand while shown at this high level in the embodiment of FIG. 21, many variations and alternatives are possible.

As discussed above, multiple instantiations of a current controller as in FIG. 21 may be provided for each of multiple voltage regulators and in turn, the multiple instantiations may be coupled to a power controller. Such power controller may perform power control for a power supply that provides power to the multiple voltage regulators. That is, in a given computing platform a single power supply may be present to power multiple external voltage regulators such as multiple voltage regulators present on a motherboard, each of which provides a given regulated voltage to be used by on-chip and off-chip components. As with the above discussion, it is possible for these individual voltage regulators to operate at higher levels when one or more other of these voltage regulators are performing at a lower level. This is so, as the single power supply that provides power to these individual voltage regulators has sufficient capability to do so, assuming that not all of the voltage regulators exceed their individual threshold levels.

Figure 22:
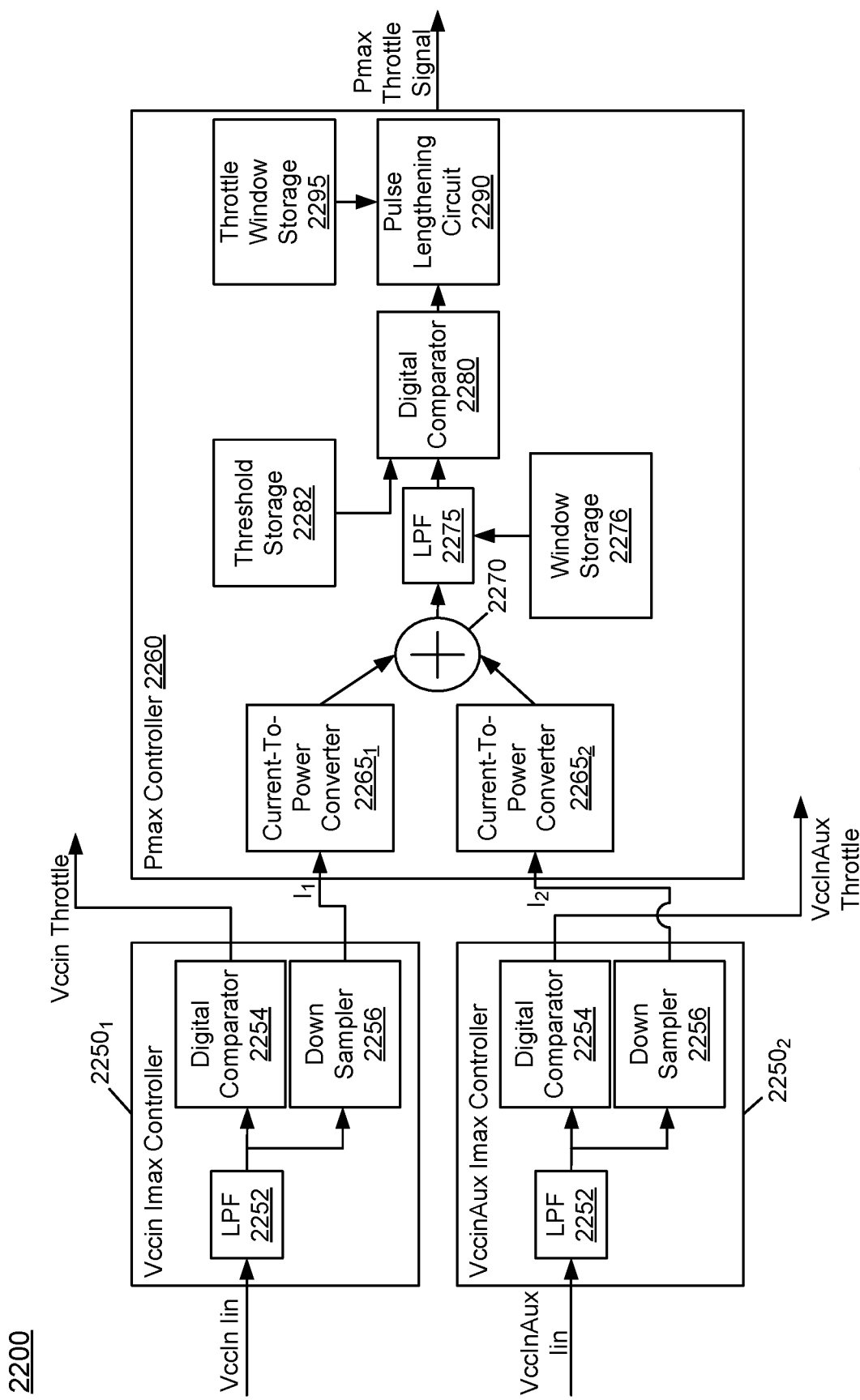
FIG. 22 is a block diagram of a control arrangement in accordance with another embodiment of the present invention.

Referring now to FIG. 22, shown is a block diagram of a control arrangement in accordance with another embodiment of the present invention. As shown in FIG. 22, multiple current controllers 2250 are provided, each associated with a given voltage regulator. More specifically as shown a first current controller $2250_1$ is associated with a first voltage regulator (not shown) that provides a first voltage level (e.g., $V_{CC}$) and a second current controller $2250_2$ is associated with a second voltage regulator (not shown) that provides a second (e.g., auxiliary) voltage level (e.g., $V_{Aux}$). Note that controllers 2250 are shown at a high level to include a corresponding low pass filter 2252, a digital comparator 2254, and a down sampler 2256, but understand that these controllers may be configured as shown in FIG. 21. Note that down sampler 2256 may be optional in some embodiments. At a high level, when the received measured current exceeds a threshold level, a corresponding throttle signal is provided to the individual domains powered by this voltage regulator, as discussed above.

In addition, current controller 2250, via down sampler 2256, performs a down sampling of the measured current consumption, which is provided in turn to a power controller 2260. Power controller 2260 may be implemented as a dedicated circuit or within a power controller of the processor. In any event, power controller 2260 converts the multiple incoming digital current values into power values via converters $2265_{1-2}$, which perform a current-to-power conversion via a multiplication operation according to a voltage delivered by a given voltage regulator (namely the regulated voltage minus any delivery loss (e.g., $I_1R_1$)) to provide a digital power value to a summer 2270, which sums the digital power values. Note that in other embodiments, power controller 2260 may receive current values directly without inclusion of current controller 2250.

In turn, this summed power value is provided to a low pass filter 2275, which may operate at a longer time window duration, according to an average time window stored in a window storage 2276. In turn this filtered power value is provided to a digital comparator 2280, which compares it to a threshold value received from a threshold storage 2282. When it is determined in digital comparator 2280 that the filtered measured power value exceeds the threshold value, a throttle event is indicated, and is communicated to a pulse lengthening circuit 2290. In general, pulse lengthening circuit 2290 may operate the same as pulse lengthening circuit 2170 discussed above, albeit at different throttle window duration, according to a value stored in a throttle window storage 2295. As such, pulse lengthening circuit 2290, based at least in part on the comparison output of digital comparator 2280, sends a throttle signal to the powered domains, to cause them to take appropriate throttling activity. Understand while shown at this high level in the embodiment of FIG. 22, many variations and alternatives are possible.

Figure 23:
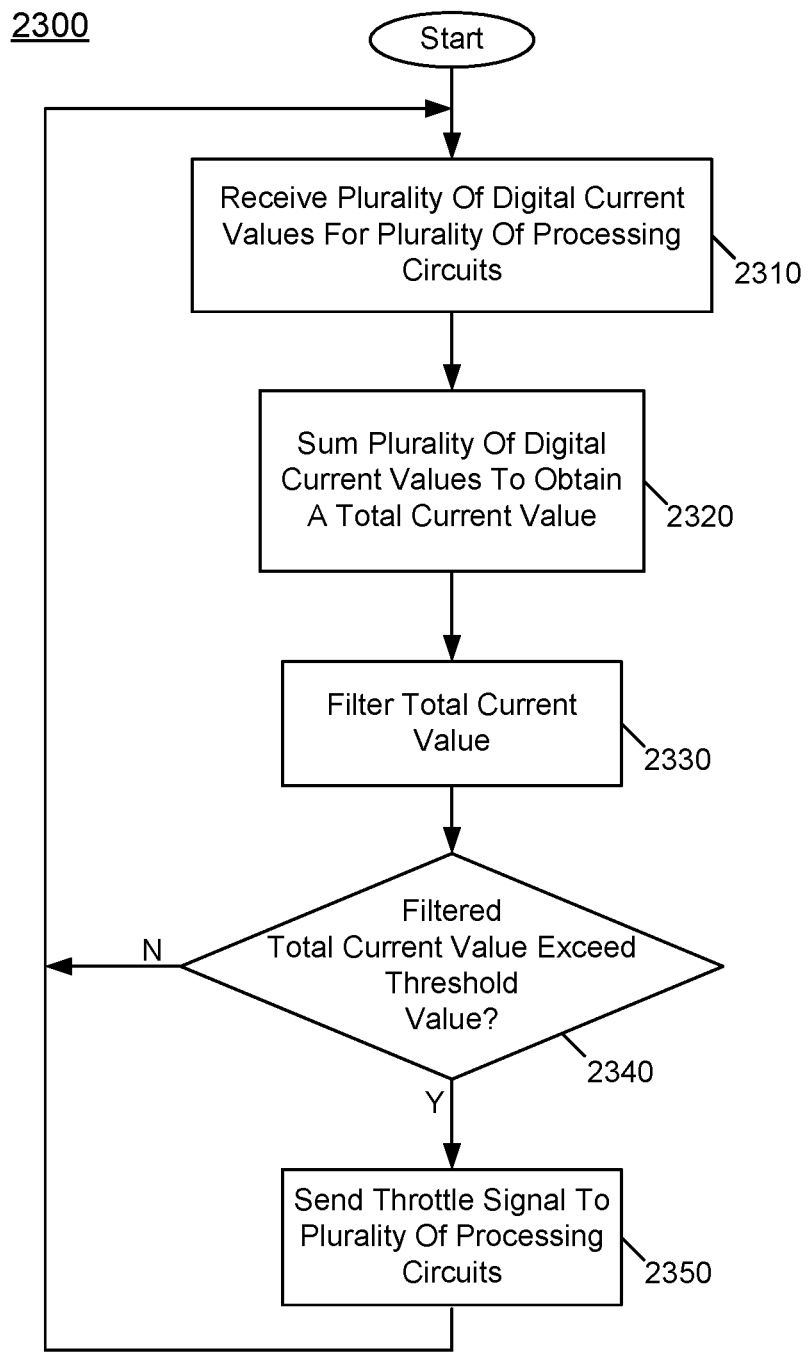
FIG. 23 is a flow diagram of a method in accordance with an embodiment of the present invention.

Referring now to FIG. 23, shown is a flow diagram of a method in accordance with an embodiment of the present invention. More specifically as shown in FIG. 23, method 2300 is a method for performing dynamic current consumption control as described herein. As such, method 2300 may be performed by hardware circuitry, firmware, software and/or combinations thereof, such as may be implemented using dedicated hardware circuitry of a processor and/or in connection with power control circuitry.

As illustrated, method 2300 begins by receiving a plurality of digital current values for a plurality of processing circuits (block 2310). More specifically, a summation circuit may receive these digital current values from corresponding integrated voltage regulators, where each voltage regulator is associated with a processing circuit such as core, graphic unit, interconnect circuitry or so forth. Understand that in other cases, there may be fewer integrated voltage regulators than processing circuits, such that one or more of the integrated voltage regulators may provide a digital current value for multiple circuits.

In any case, at block 2320 the summation circuit sums these multiple digital current values to obtain a total current value. Next, control passes to block 2330 where this total current value may be filtered. As an example, a low pass filter such as implemented in a power controller as described herein may perform filtering of this total current value according to a programmable time constant. Next, it is determined at diamond 2340 whether this filtered total current value exceeds a threshold value. If not, no further operation occurs in this iteration of the control loop, and method 2300 may continue to operate to ensure that current consumption of a processor is maintained within appropriate levels.

Still with reference to FIG. 23 instead if it is determined that the filtered total current value exceeds the threshold value, control passes to block 2350 where a throttle signal is sent to the processing circuits. Understand that in response to this throttle signal, at least one and likely multiple ones of the processing circuits may throttle their operation accordingly. For example, each processing circuit may be configured with a configured maximum current consumption value. In response to a throttle signal, a processing circuit may throttle its operation to ensure that its current consumption falls below this configured maximum current consumption value. With an arrangement as described herein, so long as the filtered total current value is less than the threshold value, processor operation may continue unthrottled. In this situation, one or more processing circuits may operate at current consumption levels exceeding their configured maximum current consumption values, while one or more other processing circuits are in operation below their configured maximum current consumption values. While shown at this high level in the embodiment of FIG. 23, many variations and alternatives are possible.

Figure 24:
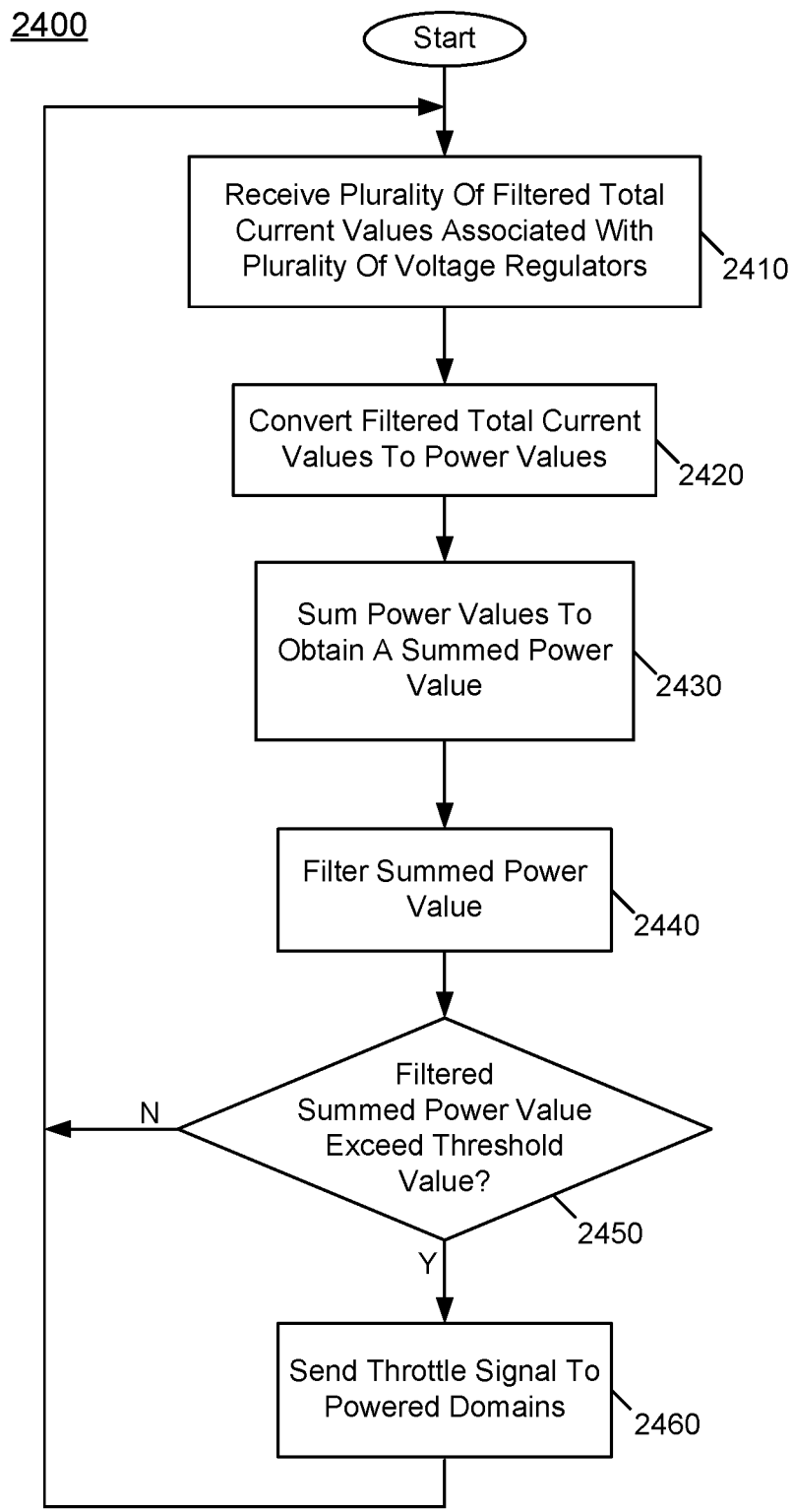
FIG. 24 is a flow diagram of a method in accordance with another embodiment of the present invention.

Understand that fast current information obtained herein further may be used to perform additional power control techniques, such as to control level of a power supply that powers multiple voltage regulators of a platform. Referring now to FIG. 24, shown is a flow diagram of a method in accordance with another embodiment of the present invention. More specifically as shown in FIG. 24, method 2400 is another method for performing dynamic current consumption control as described herein. As such, method 2400 may be performed by hardware circuitry, firmware, software and/or combinations thereof, such as may be implemented using dedicated hardware circuitry of a processor and/or in connection with power control circuitry.

As illustrated, method 2400 begins by receiving filtered total current values from current controllers associated with multiple voltage regulators (block 2410). Next, control passes to block 2420 where these filtered total current values can be converted into power values. Then the power values may be summed (block 2430). After summing the power values into a summed power value, control passes to block 2440, where this summed power value is filtered, e.g., according to a different time constant than the filtering of current values described above.

Still referring to FIG. 24, next it is determined at diamond 2450 whether this filtered power value exceeds a threshold value. If not, no further operation occurs in this iteration of the control loop, and method 2400 may continue to operate to ensure that current consumption of a processor is maintained within appropriate levels. Instead if it is determined that the filtered power value exceeds the threshold value, control passes to 2460 where a throttle signal is sent to the powered domains, e.g., the processing circuits themselves (or at least a subset of such circuits associated with a given one of the voltage regulators). Understand that in response to this throttle signal, the powered domains may throttle operation accordingly, such as by reducing their operating parameters, to cause current demand to decrease.

The following examples pertain to further embodiments.

In one example, an apparatus includes: a plurality of IP circuits, each of the plurality of IP circuits including a configuration register to store a dynamic current budget; and a power controller coupled to the plurality of IP circuits, the power controller including a dynamic current sharing control circuit to receive current throttling hint information regarding a workload to be executed on at least some of the plurality of IP circuits and generate the dynamic current budget for each of the plurality of IP circuits based at least in part thereon.

In an example, the power controller includes a plurality of second configuration registers to store the current throttling hint information, where the dynamic current sharing control circuit is to determine the dynamic current budget for the plurality of IP circuits based on the current throttling hint information and one or more parameters of the apparatus.

In an example, the power controller comprises an interface to enable a software to write the current throttling hint information to the plurality of second configuration registers.

In an example, the power controller is to receive the current throttling hint information from the software based on heuristic information as to usage of the plurality of IP circuits during execution of the workload.

In an example, the dynamic current sharing control circuit is to determine the dynamic current budget for the plurality of IP circuits further based on a configured maximum current budget for each of the plurality of IP circuits.

In an example, for a first workload, the dynamic current sharing control circuit is to: set the dynamic current budget for a first IP circuit to the configured maximum current budget for the first IP circuit; and set the dynamic current budget for a second IP circuit to less than the configured maximum current budget for the second IP circuit.

In an example, for a second workload, the dynamic current sharing control circuit is to: set the dynamic current budget for the first IP circuit to less than the configured maximum current budget for the first IP circuit; and set the dynamic current budget for the second IP circuit to the configured maximum current budget for the second IP circuit.

In an example, the first IP circuit comprises a core and the second IP circuit comprises a graphics processor.

In an example, in response to a throttle signal from the power controller, the first IP circuit is to limit operation to the configured maximum current budget for the first IP circuit and the second IP circuit is to limit operation to the dynamic current budget for the second IP circuit.

In an example, the second IP circuit is to squash one or more clock cycles of a clock signal in response to the throttle signal, based on the dynamic current budget.

In an example, the dynamic current sharing circuit is to provide opportunistic current budget to at least one of the plurality of IP circuits during a throttle event, the opportunistic current budget to enable the at least one IP circuit to exceed the dynamic current budget for the at least one IP circuit.

In another example, a method comprises: receiving, in a power controller of a processor, current throttle hint information regarding a workload from a software entity; calculating a dynamic maximum current budget for each of a plurality of processing circuits of the processor based on the current throttle hint information and configured maximum current budget values for the plurality of processing circuits; sending the dynamic maximum current budget to each of the plurality of processing circuits; and sending a throttle signal to the plurality of processing circuits in response to determining that a current consumption level of the processor exceeds a threshold, to cause the plurality of processing circuits to throttle activity based on the dynamic maximum current budget.

In an example, the method further comprises: receiving the current throttle hint information in the power controller via an interface; and storing the current throttle hint information in a set of configuration registers of the power controller.

In an example, the method further comprises determining resolved throttle values for the plurality of processing circuits based on the current throttle hint information and die-specific information.

In an example, calculating the dynamic maximum current budget for each of the plurality of processing circuits is further based on the resolved throttle values for the plurality of processing circuits.

In an example, the method further comprises: in response to the throttle signal, throttling a first processing circuit of the plurality of processing circuits; and in response to the throttle signal, enabling a second processing circuit of the plurality of processing circuits to execute unconstrained.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes an SoC and a dynamic random access memory coupled to the SoC. The SoC may include: a plurality of cores and at least one graphics processor, each of the plurality of cores and the at least one graphics processor including a configuration register to store a dynamic current budget; and a power controller coupled to the plurality of cores and the at least one graphics processor, the power controller comprising an interface to receive current throttling hint information regarding a workload to be executed on the SoC from a software entity, the power controller further comprising a dynamic current sharing control circuit to generate the dynamic current budget for the plurality of cores and the at least one graphics processor based at least in part on the current throttling hint information.

In an example, the power controller includes a plurality of second configuration registers to store the current throttling hint information, and the dynamic current sharing control circuit is to determine a resolved current budget for the plurality of cores and the at least one graphics processor based on the current throttling hint information and one or more parameters of the SoC.

In an example, the dynamic current sharing control circuit is to determine the dynamic current budget based on the resolved current budget for the plurality of cores and the at least one graphics processor and a configured maximum current budget for each of the plurality of cores and the at least one graphics processor.

In an example, for a first workload, the dynamic current sharing control circuit is to: set the dynamic current budget for at least one of the plurality of cores to the configured maximum current budget for the at least one core; and set the dynamic current budget for the at least one graphics processor to less than the configured maximum current budget for the at least one graphics processor.

In another example, an apparatus includes: a plurality of processing circuits to execute instructions; a summation circuit coupled to the plurality of processing circuits, the summation circuit to receive a plurality of digital current values each corresponding to a measured current from one of the plurality of processing circuits and to generate a total current value from the plurality of digital current values; and a current controller coupled to the summation circuit to filter the total current value and compare the filtered total current value to a threshold value, and when the filtered total current value exceeds the threshold value, send a throttle signal to the plurality of processing circuits.

In an example, each of the plurality of processing circuits is to independently throttle operation in response to the throttle signal.

In an example, each of the plurality of processing circuits is to independently throttle operation in response to the throttle signal according to a configuration value stored in a configuration storage of the corresponding processing circuit.

In an example, the apparatus further comprises a plurality of integrated voltage regulators coupled to the plurality of processing circuits to provide the plurality of digital current values to the summation circuit.

In an example, the current controller comprises: a low pass filter to filter the total current value; a digital comparator to compare the filtered total current value to the threshold value; and a pulse lengthening circuit coupled to receive a comparison signal from the digital comparator and output the throttle signal based at least in part on the comparison signal.

In an example, the pulse lengthening circuit is to maintain the throttle signal for a remainder duration of a throttle window after the filtered current value falls below the threshold value.

In an example, the apparatus further comprises: a plurality of current controllers each associated with one of a plurality of voltage regulators; and a power controller coupled to the plurality of voltage regulators. The power controller is to convert a filtered current value from each of the plurality of current controllers into a power value, combine the power values into a summed power value, filter the summed power value and send a second throttle signal to at least some of the plurality of processing circuits when the filtered summed power value exceeds a threshold power value.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of intellectual property (IP) circuits, each of the plurality of IP circuits including a configuration register to store a dynamic current budget; and
a power controller coupled to the plurality of IP circuits, the power controller including a dynamic current sharing control circuit to receive current throttling hint information regarding a workload to be executed on at least some of the plurality of IP circuits and generate the dynamic current budget for each of the plurality of IP circuits based at least in part thereon, wherein, for a first workload, the dynamic current sharing control circuit is to:
set the dynamic current budget for a first IP circuit to a configured maximum current budget for the first IP circuit; and
set the dynamic current budget for a second IP circuit to less than a configured maximum current budget for the second IP circuit.

2. The apparatus of claim 1, wherein the power controller includes a plurality of second configuration registers to store the current throttling hint information, wherein the dynamic current sharing control circuit is to determine the dynamic current budget for the plurality of IP circuits based on the current throttling hint information and one or more parameters of the apparatus.

3. The apparatus of claim 2, wherein the power controller comprises an interface to enable a software to write the current throttling hint information to the plurality of second configuration registers.

4. The apparatus of claim 3, wherein the power controller is to receive the current throttling hint information from the software based on heuristic information as to usage of the plurality of IP circuits during execution of the workload.

5. The apparatus of claim 2, wherein the dynamic current sharing control circuit is to determine the dynamic current budget for the plurality of IP circuits further based on a configured maximum current budget for each of the plurality of IP circuits.

6. The apparatus of claim 1, wherein, for a second workload, the dynamic current sharing control circuit is to:
set the dynamic current budget for the first IP circuit to less than the configured maximum current budget for the first IP circuit; and
set the dynamic current budget for the second IP circuit to the configured maximum current budget for the second IP circuit.

7. The apparatus of claim 1, wherein the first IP circuit comprises a core and the second IP circuit comprises a graphics processor.

8. The apparatus of claim 1, wherein in response to a throttle signal from the power controller, the first IP circuit is to limit operation to the configured maximum current budget for the first IP circuit and the second IP circuit is to limit operation to the dynamic current budget for the second IP circuit.

9. The apparatus of claim 8, wherein the second IP circuit is to squash one or more clock cycles of a clock signal in response to the throttle signal, based on the dynamic current budget.

10. The apparatus of claim 1, wherein the dynamic current sharing control circuit is to provide opportunistic current budget to at least one of the plurality of IP circuits during a throttle event, the opportunistic current budget to enable the at least one IP circuit to exceed the dynamic current budget for the at least one IP circuit.

11. A system comprising:
a system on chip (SoC) comprising:
- a plurality of cores and at least one graphics processor, each of the plurality of cores and the at least one graphics processor including a configuration register to store a dynamic current budget; and
- a power controller coupled to the plurality of cores and the at least one graphics processor, the power controller comprising an interface to receive current throttling hint information regarding a workload to be executed on the SoC from a software entity, the power controller further comprising a dynamic current sharing control circuit to generate the dynamic current budget for the plurality of cores and the at least one graphics processor based at least in part on the current throttling hint information, wherein, for a first workload, the dynamic current sharing control circuit is to:
  - set the dynamic current budget for at least one of the plurality of cores to a configured maximum current budget for the at least one core; and
  - set the dynamic current budget for the at least one graphics processor to less than a configured maximum current budget for the at least one graphics processor; and
- a dynamic random access memory coupled to the SoC.

12. The system of claim 11, wherein the power controller includes a plurality of second configuration registers to store the current throttling hint information, and the dynamic current sharing control circuit is to determine a resolved current budget for the plurality of cores and the at least one graphics processor based on the current throttling hint information and one or more parameters of the SoC.

13. The system of claim 12, wherein the dynamic current sharing control circuit is to determine the dynamic current budget based on the resolved current budget for the plurality of cores and the at least one graphics processor and a configured maximum current budget for each of the plurality of cores and the at least one graphics processor.

14. A system on chip (SoC) comprising:
a plurality of cores;
at least one graphics processor coupled to the plurality of cores via an interconnect, each of the plurality of cores and the at least one graphics processor including a configuration register to store a dynamic current budget; and
a power controller coupled to the plurality of cores and the at least one graphics processor, the power controller to receive current throttling hint information regarding a workload, the power controller comprising a dynamic current sharing control circuit to generate the dynamic current budget for the plurality of cores and the at least one graphics processor based at least in part on the current throttling hint information, wherein:
- for a first workload, the dynamic current budget for at least one of the plurality of cores is to be set to a configured maximum current budget for the at least one core and the dynamic current budget for the at least one graphics processor is to be set to less than a configured maximum current budget for the at least one graphics processor, and
- for a second workload, the dynamic current budget for the at least one core is to be set to less than the configured maximum current budget for the at least one core and the dynamic current budget for the at least one graphics processor is to be set to the configured maximum current budget for the at least one graphics processor.

15. The SoC of claim 14, wherein the power controller includes a plurality of second configuration registers to store the current throttling hint information.

16. The SoC of claim 14, wherein the dynamic current sharing control circuit is to determine the dynamic current budget based on a resolved current budget for the plurality of cores and the at least one graphics processor and a configured maximum current budget for the plurality of cores and the at least one graphics processor.

* * * * *